(12) United States Patent
Orlandi et al.

(10) Patent No.: US 11,878,244 B2
(45) Date of Patent: Jan. 23, 2024

(54) CUSTOMIZABLE USER INPUT RECOGNITION SYSTEMS

(71) Applicant: HOLLAND BLOORVIEW KIDS REHABILITATION HOSPITAL, Toronto (CA)

(72) Inventors: Silvia Orlandi, Toronto (CA); Thomas Tak Kin Chau, Toronto (CA); Pierre Duez, Toronto (CA); Chuzhang Han, Toronto (CA)

(73) Assignee: HOLLAND BLOORVIEW KIDS REHABILITATION HOSPITAL, Toronto (CA)

(*) Notice: Subject to any disclaimer, the term of this patent is extended or adjusted under 35 U.S.C. 154(b) by 492 days.

(21) Appl. No.: 17/017,536

(22) Filed: Sep. 10, 2020

(65) Prior Publication Data

US 2022/0072425 A1    Mar. 10, 2022

(51) Int. Cl.
| | |
|---|---|
| *A63F 13/215* | (2014.01) |
| *A63F 13/537* | (2014.01) |
| *G06F 3/16* | (2006.01) |
| *G10L 15/22* | (2006.01) |
| *G06F 3/01* | (2006.01) |
| *A63F 13/213* | (2014.01) |
| *A63F 13/428* | (2014.01) |
| *G10L 15/06* | (2013.01) |

(52) U.S. Cl.
CPC .......... *A63F 13/537* (2014.09); *A63F 13/213* (2014.09); *A63F 13/215* (2014.09); *A63F 13/428* (2014.09); *G06F 3/012* (2013.01); *G06F 3/017* (2013.01); *G06F 3/167* (2013.01); *G10L 15/063* (2013.01); *G10L 15/22* (2013.01); *G10L 2015/223* (2013.01)

(58) Field of Classification Search
CPC .... A63F 13/537; A63F 13/215; A63F 13/213; A63F 13/428; G06F 3/16; G06F 3/01
See application file for complete search history.

(56) References Cited

U.S. PATENT DOCUMENTS

| | | | |
|---|---|---|---|
| 8,958,631 B2 * | 2/2015 | Kutliroff | G06F 18/2413 382/159 |
| 9,218,545 B2 * | 12/2015 | Fahn | G06V 40/20 |
| 10,228,242 B2 * | 3/2019 | Abovitz | G06F 3/04845 |
| 10,629,192 B1 * | 4/2020 | Streat | G10L 15/063 |
| 10,824,239 B1 * | 11/2020 | Gupta | G06F 3/017 |
| 11,393,468 B2 * | 7/2022 | Hwang | G10L 15/16 |
| 2006/0040718 A1 * | 2/2006 | Davis | A63F 13/335 463/9 |
| 2010/0149090 A1 * | 6/2010 | Morris | H04L 67/01 345/156 |

(Continued)

*Primary Examiner* — David L Lewis
*Assistant Examiner* — Shauna-Kay Hall
(74) *Attorney, Agent, or Firm* — Norton Rose Fulbright Canada LLP

(57) ABSTRACT

A customizable recognition system with at least one processor to process the audio/video input to determine a control command for accessibility functions of a computer or gaming application. The customized recognition engine has a classifier for each different input type for the different types of speech or gestures. The classifier stored with a link or indication of a user identifier. The interface is configured to provide the control commands to a computer application, gaming application, or a laptop, or an access technology device.

25 Claims, 14 Drawing Sheets

(56) References Cited

U.S. PATENT DOCUMENTS

| | | | |
|---|---|---|---|
| 2012/0242566 A1* | 9/2012 | Zhang | G06F 3/017 345/156 |
| 2012/0276994 A1* | 11/2012 | Lansdale | A63F 13/53 463/31 |
| 2014/0282273 A1* | 9/2014 | Anderson | G06F 3/167 715/863 |
| 2015/0062168 A1* | 3/2015 | Ng-Thow-Hing | G02B 27/0101 345/633 |
| 2020/0143808 A1* | 5/2020 | Hwang | G10L 15/16 |
| 2020/0384362 A1* | 12/2020 | Shah | A63F 13/424 |
| 2021/0012770 A1* | 1/2021 | Choudhary | G06F 9/451 |

* cited by examiner

CUSTOMIZABLE USER INPUT RECOGNITION SYSTEMS

FIELD

Embodiments herein described relate to recognition systems for automatically recognizing or classifying user input, such as speech and gestures, for example.

BACKGROUND

Speech recognition is a system or hardware device with the ability to decode the human voice. Speech recognition can be used for computer operations to operate a device, perform commands, or write without having to use a keyboard, mouse, or press any buttons.

Facial recognition is a system capable of identifying or verifying a person from a digital image or a video frame from a video source. Facial recognition systems, in general, compare selected facial features from a given image with facial features stored within a database.

Gesture recognition is a system for the interpretation of human motions. Gesture recognition can be used to recognize a gesture input as a specific gesture, such as a head or a hand movement. Users can use gestures to control or interact with devices without physically touching them.

SUMMARY

In accordance with an aspect, there is provide a customizable recognition system with at least one processor to process the audio/video input to determine a control command for a computer application and interact with a laptop/tablet. The customized recognition engine having a classifier for each different input type for the different types of speech or gestures. The classifier stored with a link or indication of a user identifier. The interface is configured to provide the control commands to the computer application. The computer application has accessibility functions that can control operation of a computer device. The control commands actuate different accessibility functions to control operation of computer devices. Using the system, the commands can control operation of the computer device using common access tools.

In some embodiments, the computer application is a gaming application. The gaming application can be used to monitor performance of the recognition engine, for example.

In various further aspects, the disclosure provides corresponding systems and devices, and logic structures such as machine-executable coded instruction sets for implementing such systems, devices, and methods.

In one aspect, a customizable recognition system is provided to interact with accessibility functions of a computer device, the system comprising: a memory; a display; an input unit for capturing audio/video input for different types of speech or gestures; a processor coupled to the memory programmed with executable instructions, the instructions for an interface in communication with the input unit and a computer application with a plurality of accessibility functions to control operation of the computer device, the interface configured to: receive a user identifier and the audio/video input in response to prompts from the computer application; and process the audio/video input to determine a control command for the computer application using a customized recognition engine, the customized recognition engine having a classifier for each different input type for the different types of speech or gestures, the classifier linked to the user identifier, the interface configured to provide the control command to the computer application to actuate an accessibility function of the plurality of accessibility functions to control operation of the computer device.

In one aspect, a method is provided for training a customizable recognition system for input of speech or gesture, the method comprising: selecting an input type from a plurality of different input types for a computer application with a plurality of accessibility functions to control operation of the computer device, the input type corresponding to speech, movement or gesture; prompting for the input type as part of a training session of the computer application; collecting training data samples for the input type in response to the prompt, the samples linked to a user identifier; training a classifier for the input type using the training data samples, the classifier linked to the user identifier; mapping the input type to a control command of the computer application; and configuring an interface with the trained classifier, the interface for communication with an input unit and the computer application, the interface customized for the user identifier, the interface for recognizing input as the input type to trigger the control command within the computer application.

In one aspect, a customizable recognition system is provided comprising: a memory; a display; an input unit for capturing audio/video input for a tongue gesture or a look-up gesture; and a processor coupled to the memory programmed with executable instructions, the instructions for an interface in communication with the input unit and a computer application, the interface configured to: receive a user identifier and the audio/video input in response to prompts from the computer application; and process the audio/video input to determine a control command for the computer application using a customized recognition engine linked to the user identifier, the customized recognition engine having a classifier for the tongue gesture or the look-up gesture, the interface configured to provide the control commands to the computer application to actuate one ore more accessible functions to control operation of the computer device.

In this respect, before explaining at least one embodiment in detail, it is to be understood that the embodiments are not limited in application to the details of construction and to the arrangements of the components set forth in this description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 5A shows a Practice screen for words/sounds practice, while

FIG. 6A shows a first embodiment of a Play screen for selecting inputs for use in playing a game, while FIG. 6C shows a third embodiment of a Play screen for creating or selecting a model that can recognize words/sounds or movements, whereas

FIG. 8A shows a Sort screen for user-labeling audio files, while

FIG. 9B show an example Review screen for reviewing trained words/sounds input, whereas

FIG. 10A shows a first Game screen, while

DETAILED DESCRIPTION

Figure 1:
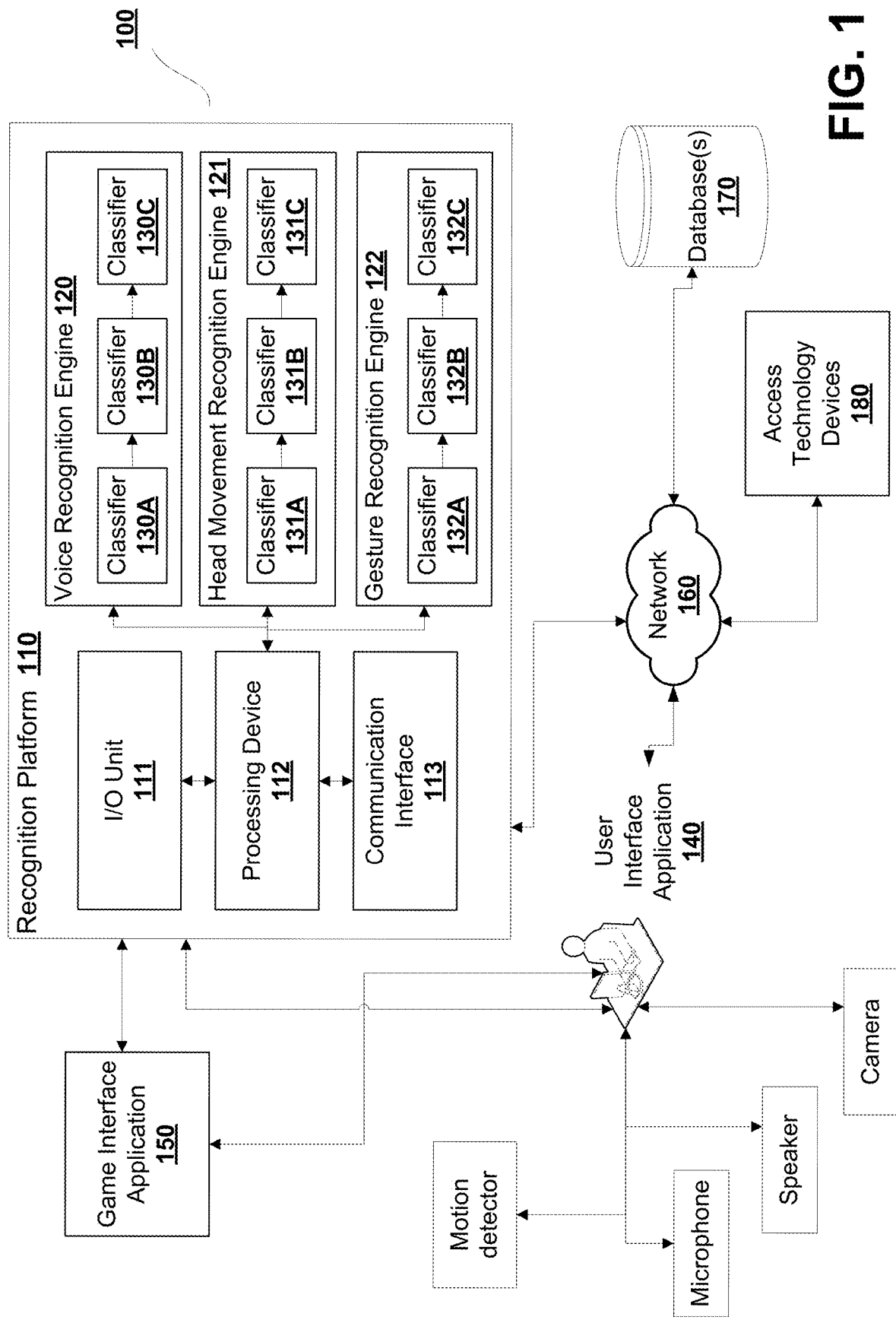
FIG. 1 shows an example interface platform and interface application, in accordance with some embodiments.

Embodiments of methods, systems, and apparatus are described through reference to the drawings.

Customizable user input recognition systems (which may also be referred to as "customizable recognition system") can provide a communication pathway for individuals with motor impairments who have limited or impaired voluntary movement or speech, and/or who cannot communicate independently. Such systems can be a suitable means of communication or environment control for these individuals, as the system is trained to recognize each individual's movement and/or speech patterns and effect an associated action. However, existing recognition systems, such as voice or facial recognition systems, have a limited customizability to individual users. This limit might be challenging for children. In particular, the communication behavior of children differs from that of adults in that children's speech and movements are less standardized and often rely on combinations of sounds and/or gesture to convey a meaning.

Cerebral palsy (CP) is a cause of physical disability in children. CP is an umbrella term describing a range of congenital neurological disorders affecting motor capabilities and posture. In most cases, CP is caused by a non-progressive insult to the brain during its early development phase. In addition to motor impairment, CP can also result in impediments to other sensory systems such as speech, hearing, and vision. As such those with CP may also have complex communication needs (CCN) and require the use of access technologies (ATs) to help improve communication participation. ATs help support children with CP by translating their intention into a control signal that can be used to operate a computer, communication aid, or environmental control.

As used herein, "access technology" ("AT") refers to component, piece of equipment or system that is used to increase, maintain, or improve the functional capabilities of individuals with disabilities. Access technology is a form of assistive technology translates intentions of user with severe impairments into functional interactions and is comprised of an access pathway and a signal processing unit. An user begins with a functional intent and expresses it through the access pathway, commonly known as a switch, through input actions that the user is capable of performing. Using sensors and input devices, the access pathway transduces the functional intent into an electrical signal that is passed through signal-processing steps to produce a control signal. This output signal from the access technology then controls user interfaces to result in functional activity. For example, augmentative and alternative communication (AAC) aids are user interfaces which help the user communicate as a functional activity. Computers can be controlled in a similar way to allow for access to the internet, games, and digital applications As used herein, "access pathway" refers to the input used to control a system and can be direct or indirect. Direct pathways are user-paced, allowing the user to control the timing of the functional activity that they dictate, such as touching an AAC screen to select an object. On the other hand, indirect pathways are system-paced, such as using a mechanical switch to select a desired letter after waiting for an on-screen keyboard to scan over it.

ATs can improve the quality of life and self-independence of children or adults with CCN and/or mobility constraints using users capabilities. Intention detection of current ATs utilize mechanical switches, physiological signals or motion analysis methods. Different physical actions/movements can be used to interact with the environment or a computer. For instance, microswitches can be used to monitor chin, eyelid, or even forehead movements through appropriate positioning and system design. Physiological signals refer to information from brain activity (e.g., EEG, MEG) or from muscle activation (e.g., EMG, MMG). The potential for these systems, however, is outweighed by current drawbacks such as long training periods to modulate specific brain potentials, high abandonment rates ranging from 30% to 70% of users, and a challenging requirement for the user to be able to generate several unique yet repeatable muscle-activation patterns. In short, while these access technologies have supported user's in their interaction with their environment, they have poor adaptability to the user's capabilities.

In some embodiments, the customizable recognition systems described herein are trained to differentiate the speech and movement of individuals with Complex Communication Needs (CCN). In one embodiment, customizable recognition systems are provided that are trained to differentiate the speech and movement of individuals with CP.

A customizable recognition system may be developed and trained to differentiate the speech and movement of children.

In one embodiment, customizable recognition systems are provided that are trained to differentiate the speech and movement of children with CCN. In one embodiment, customizable recognition systems are provided that are trained to differentiate the speech and movement of children with CP.

Another goal of customizable recognition systems is to provide a communication pathway for individuals with alternative or diverse speech or movement patterns. For example, a customizable recognition system may be developed and trained to differentiate the speech of individuals with accents or regional language conventions or dialects.

Yet another goal of customizable recognition system is to provide a dynamic communication pathway for individuals with changing speech or movement patterns over time. For example, a customizable recognition system may be developed and trained to differentiate the speech of individuals recovering from motor impairments, or experiencing degenerative motor diseases. In some embodiments, the customizable recognition system is used in monitoring user rehabilitation progress. In other embodiments, the customizable recognition system is used for language or accent training.

Embodiments of the customizable recognition system described herein can be used with user input devices, such as microphones, webcams, cameras (3D/infrared cameras), motion sensors, touch screens, sensors, wearable sensors, remote controls, scanners, etc. In some embodiments, the customizable recognition system is trained with user inputs, such as words, vocal sounds, facial gestures, eye movements, mouth movements, and head movements. By training the customizable recognition system using an user's own inputs, the system is able to recognize and differentiate the user's own movement characteristics and pronunciation of specific words. In some embodiments, the customizable recognition system having been trained with a particular user's inputs, is then able to differentiate that user's sounds and/or movements to execute an action or command based on that user's sound and/or movement inputs. For example, the executable actions or commands are for controlling a computer, laptop or tablet. These executable actions or commands can be transformed in functionalities used to scan through the icons of a desktop, writing with on-screen keyboards or playing videogames.

Embodiments of the customizable recognition system described herein includes an interface application for collecting and saving audio and/or video user inputs. In some embodiments, the interface application allows for manual labeling of a pre-recorded audio and/or video user inputs. For example, users can select the best user input samples to train a classifier.

Embodiments of the customizable recognition system described herein includes a game interface for playing a videogame using trained user inputs. When the system has enough user input samples, the user can play the videogame. In some embodiments, the user can play a videogame using a pre-selected list of trained user inputs. In some embodiments, the videogame acts as a calibration tool to calibrate access technologies (AT) to user-specific sound and/or movement inputs.

FIG. 1 is a view of an example customizable recognition system 100, in accordance with some embodiments. customizable recognition system 100 includes recognition platform 110, which includes one or more recognition engines. Recognition platform 110 connects to user interface application 140, for example, to gather user input data (such as audio and/or video data) from a user engaged with interface application 140. User interface application 140 can include capture or sensor devices (such as motion detectors, microphones, cameras, or depth and infrared sensors) to capture user input date, and can transmit and receive signals or data from capture or sensor devices and cause data to be sent to recognition platform 110. User interface application 140 can transmit and receive signals or data from capture or sensor devices, and can cause an action command to be sent to an access technology device 180 or game interface application 150. The action command can cause an entity to actuate a response, which can be an game action or operation of an access technology device.

Recognition platform 110 can connect to user interface application 140 to prompt the user with a target action, and to receive or obtain one or more user input data from the user based on the target action. A target action can be a word, a face gesture, or any physical movement by the user. The prompts can be presented on a display device using an interface generated by user interface application 140. The prompts can be presented by way of, for example, a visual representation or a sound. Recognition platform 110 can organize the received data or aggregate the data with other data. For example, user identifier data can be used by recognition platform 110 to classify user input data based on user identifiers, such as user identity, user condition, user capabilities, and/or time point.

In some embodiments, user interface application 140 can process data before sending the data via network 160 and/or to recognition platform 110. In some embodiments, recognition platform 110 can connect to interface application 140 over a network 160 (or multiple networks).

A recognition platform 110 can include an I/O Unit 111, processing device 112, and communication interface 113. A recognition platform 110 can connect with user interface application 140, game interface application 150, data sources and/or databases 170, and access technology devices 180. This connection may be over a network 160 (or multiple networks). Recognition platform 110 receives and transmits data from one or more of these via I/O unit 111. When data is received, I/O unit 111 transmits the data to processing device 112.

Each I/O unit 111 can enable the recognition platform 110 to interconnect with one or more input or sensor devices, such as a keyboard, mouse, camera, touch screen, microphone, motion detector and/or with one or more output devices such as a display screen and a speaker.

A processing device 112 can execute instructions in memory to configure recognition engines 120, 121, 122 and/or classification devices 130A-C, 131A-C, 132A-C. A processing device 112 can be, for example, any type of general-purpose microprocessor or microcontroller, a digital signal processing (DSP) processor, an integrated circuit, a field programmable gate array (FPGA), a reconfigurable processor, or any combination thereof.

Memory may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each communication interface 113 can enable the recognition platform 110 to communicate with other components, to exchange data with other components, to access and connect to network resources, to serve applications, and perform other computing applications by connecting to a network (or multiple networks) capable of carrying data.

The recognition platform 110 can be operable to register and authenticate users (using a login, unique identifier, and password for example) prior to providing access to applications, a local network, network resources, other networks and network security devices. The recognition platform 110 may serve one user or multiple users.

In some embodiments, recognition platform 110 includes multiple recognition engines. In some embodiments, each recognition engine has a set of classifiers linked to different user identifiers. In some embodiments, each recognition engine is configured for (1) segmentation, (2) feature extraction, and (3) classification using classification devices that are trained using user input data associated with a particular user identifier. Classification devices 130A-C, 131A-C, 132A-C can be used to build a classification model by training on user input data received from user interface application 140. In some embodiment, signal processing and feature extraction units associated with a classification device can process the user input data, for example, to remove noise. Signal processing and feature extraction units can extract features from the user input data using one or more feature extraction methods. In some embodiments, a classification model is trained on user input data or features selected from one or more users. In some embodiments, classification units associated with the classification devices can use the selected features to train an algorithm. The algorithm can be used for machine learning classification of user input data to facilitate classification of user speech, face gestures, or head movements that is customized to the user.

In some embodiments, recognition platform 110 includes speech recognition engine 120, having multiple classification devices 130A, 130B, 130C. Classification devices 130A, 130B, 130C are untrained recognition engine for isolated words or voice sounds (i.e., vocalizations) that is then configured or trained to classify user input data representing voice sounds based on user identifiers (trained recognition engine specific to user voice sounds). In some embodiments, recognition platform 110 includes head movement recognition engine 121, having multiple classification devices 131A, 131B, 131C. Classification devices 131A, 131B, 131C are untrained recognition engine for head movements that is then configured or trained to classify user input data representing head movements based on user identifiers (trained recognition engine specific to user head movements). In some embodiments, recognition platform 110 includes face gesture recognition engine (smiling, eye blinking, or mouth opening) 122, having multiple classification devices 132A, 132B, 132C. Classification devices 132A, 132B, 132C are untrained recognition engine for face gestures that is then configured or trained to classify user input data representing gestures based on user identifiers (trained recognition engine specific to user face gestures). In some embodiments, recognition platform 110 includes other recognition engines for tongue detection, looking up, eyebrow raise, or lip puckering. Each recognition engine has classification devices configured or trained to classify user input data representing respective user movement. Although only one gesture recognition engine 122 is shown for ease of illustration, there can be multiple gesture recognition engines 122 configured for specific gestures and locations. For example, there can be instructions to configure gesture recognition engine 122 for tongue classification based on gestures involving tongue and locations of the gestures (e.g. face or head). The gesture recognition engine 122 can be configured for (1) segmentation; (2) feature extraction; (3) classification (e.g. using classifiers that are trained using samples from User A). The gesture recognition engine 122 can have various gesture classifiers (e.g. general instance, untrained model for gesture movements) that is then configured or trained to be a User A gesture classifier (e.g. trained model specific to User A gesture movement).

The speech recognition engine 120 can recognizes isolated words or vocalizations. This procedure is called keyword spotting or isolated word recognition.

Recognition engines 120, 121, 122 involve different types of classifiers for different users and the classifiers can receive different types of input data.

Recognition engines 120, 121, 122 associated with recognition platform 110 can receive sensor data, for example, user audio and/or video input data from one or more users via user interface application 140. Recognition engines 120, 121, 122 can receive stored data from one or more databases 170 or user interface application 140, such as data corresponding to other sessions of data collection, for example. Classification devices of the recognition engines can build or train a classification model using this data, for example, user audio and/or video input data from one or more users. Classification devices can use the classifier to classify speech, gesture, or movement of the user and cause an action command to be sent to an access technology device 180 or game interface application 150. The action command can cause an entity to actuate a response, which can be an game action or operation of an access technology device.

The recognition engines can be re-trained on additional user input data, for example, data collected from the user at a more contemporaneous time. This may improve the accuracy of the classifiers, for example, to account for changes in user speech or movement over time. Further, additional user data may improve the accuracy of the classifier so it can be continuously updated and trained as more data and feedback is provided to the recognition platform 110.

Game interface application 150 can connect to recognition platform 110 and/or recognition engines and respective classification devices, for example via a network (or multiple networks). Game interface application 150 can collect user gameplay data, and cause the gameplay data to be sent to recognition platform 110. The recognition engines can be re-trained on user gameplay data, for example, data collected from the user during an interactive game. User gameplay data may improve the accuracy of the classifier so it can be continuously updated and trained as more data and feedback is provided to the recognition platform 110.

Recognition platform 110 can connect to user interface application 130 via a network 160 (or multiple networks). Network 160 (or multiple networks) is capable of carrying data and can involve wired connections, wireless connections, or a combination thereof. Network 160 may involve different network communication technologies, standards and protocols, for example.

In some embodiments, access technology devices 180 can connect to recognition platform 110 and/or recognition engines and respective classification devices, for example, via network 160 (or multiple networks). Access technology devices 180 can receive data from an user interface application 140, recognition platform 110, and/or recognition engines. This data can include raw data collected by user interface application 140, data processed by user interface application 140, recognition platform 110, and/or recognition engines (including a classification devices. In some embodiments, this connectivity is used to increase, maintain, or improve the functional capabilities of users with disabilities engaged with an access technology device 180.

Speech Recognition Engine

Vocal Switch (VC) is a speaker-dependent recognition engine that is configured to recognize custom words pronounced by a user or vocalizations by a user. In some embodiments, the user is a child. In some embodiments, the user has mild, moderate, or severe speech impairment.

One example of a VC was developed in C++ to process sound samples in a sliding window, applying mean square energy (MSE), thresholding to determine the presence of a vocalization/sound/word, and a Hidden Markov Model (HMM) classifier to determine proximity to a series of class centroids. The flexible nature of this classifier allowed the user to change the number and nature of the active classes for consideration on an ongoing basis. The VC performance was evaluated on the recognition of up to 6 isolated words or sounds reaching accuracy between 89% and 99% (precision up to 97% and recall up to 95%) on 5 typically developing children and 2 with CP and speech impairment aged from 6 to 18.

Architecture. There were two significant components of this VC: the audio-processing module (APM) running as an independent thread within the system (and receiving messages from other modules within the application that control configuration, activity, and output) and the Audio Acquisition/Retransmission module (AAR) running on Raspberry Pi 3B+ (Rpi). Communication between the two modules took place using the Lab-Streaming Layer (LSL) protocol, over a local network connection. The implemented speech recognition algorithm includes feature extraction and classification and was extremely sensitive—even with per-sample normalization—to variances in microphone level and changes in microphone. For this reason, sound acquisition was isolated to a device (the RPi) to which the user has no access, while still leveraging the higher CPU capability of the computer (PC/tablet) running the recognition platform. The RPi captured audio samples (using for example an audio acquisition and retransmission module) in a consistent manner and transferred it in real-time (via a network link) to the computer for processing.

Segmentation and preprocessing. The segmentation included the voice activity detection (VAD) based on a binary decision. The algorithm determined the probability that an input signal contains speech or no-speech using an energy thresholding though the MSE. The input signal was windowed with a 100 ms window. The energy was estimated in each window to determine whether it was a silence sample or not. If the duration of speech activity (measured as a count of consecutive 100 ms windows whose MSE exceeds a threshold) falls within a hard-coded range, the windows were labeled as a single vocal sample. Each vocal sample was then normalized. Some samples can contain environmental noise or not-user's voice. This issue was solved during the classification phase.

Feature Extraction. After signal detrending and normalization, 37 acoustical features were extracted from audio samples sampled at 44.1 kHz. 12 Mel-frequency cepstral coefficients (MFCCs), first and second MFCC derivatives, and signal energy were estimated.

The speech sample was first preemphasized using a first order FIR filter with 0.97 of preemphasis coefficient. Then, a short-time Fourier transform was applied using a hamming window of 25 ms and a 10 ms frame shift. Then, a magnitude spectrum computation was followed by filterbank designed with 23 or 26 triangular filters uniformly spaced on the mel scale using a frequency range of 50 and 8000 Hz. The filterbank was applied to the magnitude spectrum values to produce filterbank energies (FBEs). Log-compressed FBEs were then decorrelated using the discrete cosine transform to produce cepstral coefficients. A sinusoidal lifter was used to produce liftered MFCCs. This framework was based on Dan Ellis' rastamat routines (Reproducing the feature outputs of common programs using Matlab and melfcc.m, 2005). The double of the signal sampling frequency (88.2 kHz) was used to produce the triangular filterbank and estimate the window to uniformly space filters on mel scale.

Extracted features were used to feed a HMM in distinguishing sounds and words.

Classification. The classification model required to be trained on a minimum of 50 samples for each word (class). In some embodiments, samples were manually labeled. Each word/sound class would be generated after the manual labeling. The system would generate an additional class that includes miscellaneous samples of environmental noise and other speakers' voice that will be used by the classifier to distinguish the speaker voice. The generated classes were used as input of the classification algorithm to obtain a speaker-dependent system detecting keywords (e.g., "next" and "go"). The algorithm initialized class-specific HMMs (based on the number of words and one class related to miscellaneous samples) and trains them using an iterative, greedy searching technique called Expectation-Maximization (EM) to maximize the log-likelihood. The EM allows generating a mixture of Gaussians (3 in our pipeline) that will be used for the purpose of initializing the HMMs.

The model initialization divided the observations into equal clusters to perform the k-means clustering, in order to initialize the centroids of each class. The k-means is an automatic procedure for clustering unlabeled data and requires a predefined number of clusters (6 states in an example pipeline) minimizing the within-cluster variances of point-to-cluster-centroid distances through squared Euclidean distances. Mean, covariance, and weights were initialized through the k-means clustering performed in each segment. The output of this function was used for the purpose of initializing HMMs in the training phase (e.g. estimating mean, covariance, and weights of each mixture of Gaussian output).

In an example experiment, 5-fold cross-validation (CV) repeated 10 times was used to evaluate the performance in terms of accuracy, specificity, and sensitivity. When performance was over 90% of accuracy the classifier was ready to be used. If 90% of accuracy were not reached additional samples are necessary. The user would then practice again collecting new samples and after the manual labeling, the classifier would be trained and tested again.

Head Movement Recognition Engine

The head movement recognition (HMR) engine 121 is configured to recognize head movements such as a head roll (tilting the head side to side), a head pitch (moving the head to look up and down), or a head yaw (side to side movement as in looking left and right). Examples of head pose estimation and recognition include, but are not limited to: geometric methods using already identified face landmarks, tracking methods using Lucas-Kanade optical flow estimation, detector array methods, nonlinear regression methods, manifold embedding methods, flexible models (such as Active Appearance Model), or appearance template methods. HMR is usually performed through a three-step procedure (Murphy-Chutorian, E., & Trivedi, M. M. (2008). Head pose estimation in computer vision: A survey. *IEEE transactions on pattern analysis and machine intelligence*, 31(4), 607-626): head identification, head pose estimation, and head movement classification. Once head pose estimation is performed, temporal changes in those poses are analyzed as appropriate. Head movements are then identified using classification methods such as Hidden Markov Models (HMMs) or thresholding.

Database Screening. The head movement recognition (HMR) engine 121 can use different head movement databases to train and test the classification methods. In an example experiment, a HMR classifier was trained using existing datasets, such as the UPNA Gaze Interaction For Everybody (GI4E) head pose dataset (Ariz, M., Bengoechea, J. J., Villanueva, A., & Cabeza, R. (2016). A novel 2D/3D database with automatic face annotation for head tracking and pose estimation. *Computer Vision and Image Understanding,* 148, 201-210), the Boston University (BU) head tracking dataset (La Cascia, M. Sclaroff, S., & Athitsos, V. (2000). Fast, reliable head tracking under varying illumination: An approach based on registration of texture-mapped 3D models. *IEEE Transactions on pattern analysis and machine intelligence,* 22(4), 322-336), and the Biwi Kinect Head Pose dataset (Kinect HPDB) (Fanelli, G., Dantone, M., Gall, J., Fossati, A., & Van Gool, L. (2013), Random forests for real time 3d face analysis. *International journal of computer vision,* 101(3), 437-458). As the databases have different types of head movements, the videos from the databases were first screened manually for clear rotational head movements of interest (pitch, roll, and yaw). 276 videos of adults from databases (67 pitch movements, 71 yaw movements, 43 roll movements, and 95 miscellaneous movements) were screened and processed resulting in 100 video clips from the UPNA database, 41 video clips from the Kinect HPDB, and 135 video clips from the BU database. A miscellaneous class (misc) for random unintentional head movements was created using videos of free movement sequences or combinational movements in all three degrees of freedom. The miscellaneous samples included videos of different head movements or facial gestures (e.g., smiling) with minimal head movements. As each videoclip often included multiple repetitions of head movements, the videos were trimmed to isolate pitch, yaw, and roll head movements.

Feature Extraction: Head Identification and Head Pose Estimation. Example feature extraction algorithms include Features from Accelerated Segment Test (FAST) and Haar-like feature. Methods for extracting these head angles include using optical flow modeling, direct head pose reading using either a Microsoft Kinect or the depth-sensing front-facing camera of the Apple iPhone-X, and the Pose from Orthography and Scaling with Iterations (POSIT) (Kim, W. W. Park, S., Hwang, J., & Lee, S. (2011, December). Automatic head pose estimation from a single camera using projective geometry. In *2011 8th International Conference on Information, Communications & Signal Processing* (pp. 1-5). IEEE).

In an example experiment, sixty-eight facial landmarks were automatically detected and tracked using the dlib implementation (King, D., E., Dlib-ml: A machine learning toolkit, *Journal of Machine Learning Research*, vol. 10, pp. 1755-1758, 2009) of the face alignment algorithm proposed by Kazemi and Sullivan (One millisecond face alignment with an ensemble of regression trees, In *Proceedings of the IEEE conference on computer vision and pattern recognition*, pp. 1867-1874, 2014). Facial features (pitch, yaw, and roll angles of the head) were extracted from 14 facial landmarks (left/right corners of eyebrows, left/right corners of eyes, left/right corners of nose and mouth, central point of lower lip and chin). The 3D coordinates of the 14 facial landmarks were then extrapolated and used to calculate the head pose. The Euler angles $\phi=\{x, y, z\}$, where x corresponds to pitch, y to yaw, and z to roll, were calculated using POSIT algorithm which projects the facial landmarks of a generic 3D head model onto the image plane with the frame and optimizes the difference in the position of the projected landmarks and the actual landmarks of the user. The POSIT method was implemented using the OpenCV libraries.

Head Movement Classification. The time series of the three head angles were used as inputs to train four HMMs. Each HMM is defined by a number of states, states transition probabilities, observation probabilities, and initial probabilities. The HMM configuration used six HMMs including all the possible states for pitch, yaw, and roll movements. Seven states were identified: stable, up, down, left, right, left tilt, and right tilt. The algorithm initialized class-specific HMMs, one for each of the 4 classes (pitch, yaw, roll, and misc). Then all HMMs were trained by the iterative greedy searching technique called Expectation-Maximization (EM) to maximize the log-likelihood. The model initialization divided the observations into equal clusters to perform the k-means clustering, in order to initialize the centroids of each class, minimizing the within-cluster variances of point-to-cluster-centroid distances through squared Euclidean distances. The output of the states was represented through a mixture of three Gaussian distributions. As such, the probability of generating an observation represents the product of the probability of first selecting one of the Gaussians and the probability of generating that observation from that Gaussian.

Evaluation of the Head Movement Classifier. In an example experiment, classifier performance was first validated using a Leave-One-Subject-Out (LOSO) cross-validation on the existing datasets (training set) and then tested on video samples of 5 typically developing children aged from 6 to 18 (testing set: P1-5). Each video was manually annotated to generate the ground truth of the movement classes. A total of 363 videos containing 105 pitch repetitions, 109 yaw repetitions, 116 roll repetitions, and 33 miscellaneous samples were extracted and used as a test set. A 4-class HMM was generated using the training set and evaluated with the testing set. The four classes represented pitch, yaw, roll, and miscellaneous movements. The LOSO cross-validation results for each class obtained with the adult dataset are shown in Table I in terms of average performance among the 38 adults. Classifier performance of head movement recognition for the children dataset is shown in Table II. In this case, the training set included the entire adult dataset.

Classifier performance was reported in terms of accuracy (Acc—number of movement instances correctly classified), precision (Prec—e.g., number of pitch instances correctly classified divided by the number of movement instances), recall (Rec—e.g., number of pitch instances correctly classified divided by the actual number of pitch instances), and F1-score (F1—the harmonic mean of Prec and Rec).

TABLE I

CLASSIFICATION PERFORMANCE ON ADULT DATASET

| Head Movement | Acc (%) | Prec (%) | Rec (%) | F1 (%) |
| --- | --- | --- | --- | --- |
| Pitch | 92.2 ± 12.7 | 97.8 ± 10.4 | 72.0 ± 39.6 | 90.3 ± 15.9 |
| Roll | | 93.1 ± 24.3 | 93.1 ± 24.3 | 98.9 ± 3.1 |
| Yaw | | 85.5 ± 23.9 | 93.8 ± 22.8 | 89.7 ± 16.9 |
| Misc | | 98.5 ± 4.6 | 100.0 ± 0.0 | 99.2 ± 2.5 |

TABLE II

CLASSIFICATION PERFORMANCE ON CHILDREN DATASET

| Child | Head Movement | Acc (%) | Prec (%) | Rec (%) | F1 (%) |
|---|---|---|---|---|---|
| P1 | Pitch | 93.5 | 100.0 | 80.0 | 88.9 |
|  | Roll |  | 95.2 | 100.0 | 97.6 |
|  | Yaw |  | 90.9 | 100.0 | 95.2 |
|  | Misc |  | 66.7 | 100.0 | 80.0 |
| P2 | Pitch | 91.2 | 100.0 | 90.0 | 94.7 |
|  | Roll |  | 87.0 | 100.0 | 93.0 |
|  | Yaw |  | 94.7 | 90.0 | 92.3 |
|  | Misc |  | 75.0 | 75.0 | 75.0 |
| P3 | Pitch | 85.5 | 94.4 | 85.0 | 89.5 |
|  | Roll |  | 76.0 | 95.0 | 84.4 |
|  | Yaw |  | 89.5 | 85.0 | 87.2 |
|  | Misc |  | 85.7 | 66.7 | 75.0 |
| P4 | Pitch | 95.6 | 100.0 | 88.5 | 93.9 |
|  | Roll |  | 88.2 | 100.0 | 93.8 |
|  | Yaw |  | 100.0 | 96.6 | 98.2 |
|  | Misc |  | 100.0 | 100.0 | 100.0 |
| P5 | Pitch | 89.0 | 85.7 | 94.7 | 90.0 |
|  | Roll |  | 92.6 | 96.2 | 94.3 |
|  | Yaw |  | 94.4 | 85.0 | 89.5 |
|  | Misc |  | 71.4 | 62.5 | 66.7 |

Discussion. The HMM-based head movement algorithm was first validated on the adult dataset showing an average accuracy rate of 92.2% in the identification of the three head movements and the miscellaneous class, with a low rate of false positives. False positives play a key role in developing algorithms for ATs, as generating a high number of instances that wrongly activate the AT may increase the risk of abandonment. The lower percentage value for the pitch class was likely due to the selection of movements for the miscellaneous class, which had many slight pitch motions incorporated into the random head motions.

The robustness of the HMM models is proven by the performance of the miscellaneous class. The 100% recall rate indicates that the model has learnt how to differentiate the miscellaneous class from the three target movements. Children with CP and complex communication needs may have wider variability and less control of their movements, which would increase the importance of having an accurate miscellaneous class. The HMM-based algorithm was tested with children, showing high performance for all five participants using the model trained on the adult dataset (85.5-95.6% accuracy).

Performance seems to decrease with the children's ages, except for P4. Considering the small sample size of our testing dataset, no further conclusions can be drawn, but this age correlation could be linked to the ability of the older children to stay focused during the repetition of each movement, avoiding random movements. Two participants, P3 and P5 got bored after a few repetitions, introducing high variability in the execution of the movements. The performance obtained with these two participants could probably be closer to the potential performance of a child with CP. Especially in dyskinetic CP, the muscles switching between excessive tone and low tone may cause random and uncontrolled body movements or spasms.

Orofacial Gesture Recognition Engine

The orofacial gesture recognition engine is configured to recognize facial movements. This can be implemented as an example gesture recognition engine 122. Example orofacial gesture recognition include, but are not limited to: Camera Mouse for face and hand gestures (Betke, M., Gips, J., & Fleming, P. (2002). The camera mouse: visual tracking of body features to provide computer access for people with severe disabilities. *IEEE Transactions on neural systems and Rehabilitation Engineering*, 10(1), 1-10), LipMouse for gestures made with the mouth (Dalka, P., & Czyzewski, A. (2009, October). Lip movement and gesture recognition for a multimodal human-computer interface. In 2009 *International Multiconference on Computer Science and Information Technology* (pp. 451-455). IEEE.), i4control system for eye tracking (Fejtová, M., Fejt, J., Novák, P., & Stepankova, O. (2006, June), System I4Control® Contactless control PC. In 2006 *International Conference on Intelligent Engineering Systems* (pp. 297-302). IEEE), or GazeSpeak that tracks eye movements (San Agustin, J., Skovsgaard, H., Mollenbach, E., Barret, M., Tall, M., Hansen, D. W., & Hansen, J. P. (2010, March). Evaluation of a low-cost open-source gaze tracker. In *Proceedings of the 2010 Symposium on Eye-Tracking Research & Applications* (pp. 77-80)) to highlight groups of letters and detects winks to select letters and words.

For any system that uses facial gestures as an input, the face and facial features must be located. The initialization step, where the face is first detected, can be manual or automatic. Manual initialization involves the user clicking the face or the feature that is to be tracked, such as in Camera Mouse. Automatic initialization is more difficult and computationally demanding, but allows the system to be more robust. After the system is initialized, the face or facial feature can be localized in subsequent frames through detection or through tracking, using for example, template matching which is a technique used in digital image processing for finding small parts of an image which match a reference template image. Examples of automated facial feature tracking, head pose estimation, facial attribute recognition, and facial expression analysis from video are Intraface (De la Torre, F., Chu, W. S., Xiong, X. Vicente, F., Ding, X., & Cohn, J. (2015, May). Intraface. In *IEEE International Conference on Automatic Face & Gesture Recognition and Workshops* (Vol. 1, pp. 10-1109) or dlib. After the face has been localized across each from of a video, the resulting model of the face must be converted into useful inputs through feature extraction, from which facial gestures can be deduced. Example feature extraction include Eyebrow Clicker (Lombardi, J., & Betke, M, (2002). *A self-initializing eyebrow tracker for binary switch emulation*. Boston University Computer Science Department) which uses the distance between the eyes and eyebrows as indication of an eyebrow raise; or Region-Based Matching technique. Lastly, face gesture classification is the process of determining whether certain facial gestures are present in the face videos by analyzing the features which have been extracted. The most common form of analysis is thresholding. Classification of facial gestures can also be achieved through machine learning techniques instead of thresholding on features.

Gesture Recognition Engine Overview. The input to the system are face gesture videos. In some embodiments, videos were taken from a database of facial expression videos of able-bodied adults (CK+ dataset-Lucey, P., Cohn, J. F., Kanade, T., Saragih, J., Ambadar, Z., & Matthews, I. (2010, June). The extended cohn-kanade dataset (CK+): A complete dataset for action unit and emotion-specified expression. In 2010 ieee computer society conference on computer vision and pattern recognition-workshops (pp. 94-101). IEEE) and used as training and test sets to evaluate the classification performance. The landmarks on the face will be located and tracked across all frames in the video through a face-tracker, (i.e., Intraface or dlib). Geometric features around the mouth region were extracted from the coordinates of the landmarks. Out of the extracted features, the ones that were most indicative of the facial gestures were chosen and used to classify the gesture. During classification, the system first determined whether intentional movement existed in the video. If such movements existed, a trained HMM classifier would determine whether the gesture is smiling or mouth opening. A 2-stage hierarchical classifier was defined, where each stage is a binary classification problem. The first stage separates smiling (S) and mouth opening (O) gestures from a class that includes miscellaneous (M) (e.g., disgust face, sadness face, anger face) gestures and neutral faces (N); the second layer classifies between smiling and mouth opening. The entire system was coded and tested in C++ and in MATLAB. Where needed, functions from the OpenCV toolbox was used.

Database Selection and Processing. As an initial test of feasibility of the proposed HMM-based facial gesture classifier, facial expression databases offered an effective way to test the system. They presented large datasets, which would otherwise be difficult to acquire through experimental participants, that can be used to train the models. For example, the CK+ database was selected. Video sequences were more desirable than still images since they presented more realistic training data to a system which would be used to analyze live videos. The CK+ database also had sufficient metadata, including FACS codes on each of the video sequences. FACS data could be used to more easily categorize the videos into facial gestures of interest. The full database contained videos and images form 210 adults ranging from 18 to 50 years of age with 69% females and 31% males. However, only videos of 123 participants contained FACS coding and thus were useable. The number of videos of each participant varied, ranging from 1 to 11, with a mean of 4.81 and a standard deviation of 2.19.

To create the training datasets for smiling and mouth opening, the facial expression videos were categorized based on the FACS codes present. Videos with AU27, mouth stretch, were placed in the mouth opening dataset. Smiling videos were more difficult to identify; all smiling videos were expected to contain AU12 lip corner puller, but some videos of disgust and sadness also contained AU12. However, sadness is also consistently associated with AU4 (brow lowerer), as is disgust with AU9 (nose wrinkle). As such, videos which contained AU12 but not AU4 and AU9 were placed in the smiling dataset. All other videos were placed into the miscellaneous facial gesture dataset (misc). Finally, videos in all 3 datasets with 3 or fewer frames were eliminated, since they did not present enough data for the HMM that was initialized with 4 states. The resulting datasets consisted of 117 smiling videos, 80 mouth opening videos, and 385 miscellaneous videos. These 582 remaining videos had a framerate of 30 fps, and the number of frames in each ranges from 4 to 68, with a mean of 15.25 and a standard deviation of 8.38.

In addition, a dataset comprising of neutral face videos was created. Since there was no way to automatically identify in each video when the neutral face began to move, an approximation was made. For each video with 15 frames or more, the first 3 frames were cropped as the neutral face video. For videos with more than 25 frames, the first 5 frames were cropped instead. These values were empirically determined.

Each participant recorded a different number of facial expression videos, which may bias the trained classifier towards the facial movements of certain participants who were better represented in the training set. In addition, not every participant recorded videos that can be categorized as smiling or mouth opening gestures. As a result, classes created from these video samples would be imbalanced, which may reduce classifier performance. Therefore, a dataset with the same number of participants in each class and the same number of samples per participant was created. Only participants with samples in all the 4 classes (S, O, N, M) were included. Sixty-five participants were identified. Five video samples per class were included for each participants. If a participant had fewer than 5 samples, the samples were randomly duplicated to upsample the data. For 65 participants with 5 samples in each of the 4 classes, the final dataset consisted of 325 videos in each class, for a total of 1300 video samples.

Face Tracking and face alignment. In a example experiment, the Intraface package was used to both detect the face in each video and track the facial landmarks across each frame. Intraface uses the Supervised Descent Method (SDM) for face alignment, in order to detect and track a template of 66 facial landmarks. Seventeen of these landmarks delineate the outline of the bottom half of the face. Since these landmarks were of no interest to the 2 facial gestures considered, they were discarded. The remaining 49 landmarks were located on each frame. The X (horizontal) and Y (vertical) coordinates of the 49 facial landmarks, as well as the roll, yaw, and pitch angles of the head were estimated according to their pixel position on the frame. Since the videos from the CK+ database were all frontal facing with minimal rotation and in-plane movement, landmarks were correctly located in every frame of every video.

Feature Extraction. Features were extracted from the mouth region. Features of the face were estimated based on previous work on lip reading (Orlandi, S., Huang, J., McGillivray, J., Han, C., Hotze, F., Mumford, L., & Chau, T. (2019, October). Audio-Visual Keyword Spotting for Access Technology in Children with Cerebral Palsy and Speech Impairment. In *Assistive Technology*, Vol. 31, No. 5, pp. 241-241) for a speech recognition-based AT and using the current state-of-the-art research on lip movements. The 57 lip features include basic measurements (e.g. lip height, ratio of width over height for inner and outer lip contour), perimeters, sub-heights (e.g. height of the lip near the mouth corner), thicknesses and areas of individual lips (e.g., total area of the teeth region, mouth total area), and angles formed by pairs or groups of lip landmarks. Each feature was also normalized against the intercanthal distance (distance between the inner eye corners) in the frame to account for potential variations in the distance between the participant and the camera. The extracted features for each video were stored as numeric values inside an N×57 matrix, where N is the number of frames in the video. In essence, each column in the matrix forms a vector that describes how the feature changes across the frames of the video.

Feature Selection. All methods used to select the features were based on evaluation of the F1-score for the column vector of each feature. F1-score is a measure of discrimination between two sets of real numbers and it is very robust for binary classification problem. A high F1-score for a feature indicates that the feature is more discriminative, and thus a threshold can be set on F1-score to form the feature selection criterion. Best features were selected using F1-score method to achieve optimal facial gesture classification accuracy, which can lead to improved control of ATs.

Some features out of the 57 were closely correlated with others such that change in one feature almost resulted in a proportional change in the other feature. Pairs or groups of such features may cause redundancies in the HMM, where the additional, redundant features offer no useful information and result in little or no increase in classifier performance. A statistical approach, Spearman's Rank Correlation Coefficient can be used to eliminate these redundant features from the selection process. The correlation coefficient was calculated for each feature pair formed between the 57 features. Feature pairs which had a coefficient greater than 0.95 were deemed to have correlations which were statistically significant and therefore indicated a redundancy. 48 such pairs were identified. In each pair, the feature with the higher F1-score as presented in the previous section was kept while the other was eliminated. In some instances, 3 or more features were each correlated with the others, forming a group of redundant features. In these cases, only the feature with the highest F1-score was kept. All features that did not belong to a correlated pair were inherently not redundant and therefore kept. Following this method, 24 features were eliminated. The corresponding vectors for these features in the feature matrices were likewise removed and F1-scores were calculated for the remaining 33 features.

In the first stage of the hierarchical configuration (i.e., 2-state classifier), the datasets for smiling and mouth opening were combined into one class (S+O), while miscellaneous and neutral samples remained as the other class (M+N). For each gesture (S, O, M, and N), there were 5 samples per participant, and thus the first stage had 650 samples in each class and the second stage had 325 samples in each class.

F1-scores were calculated for the 33 features. Applying a threshold of 0.25, 2 features were selected. In the second stage of the cascade, the same F1-score analysis was applied with the smiling and mouth opening datasets as the 2 classes involved in the classification. Once again applying a threshold of 0.25, 10 features were selected.

Selected features were used to feed a HMM in distinguishing orofacial gestures from the miscellaneous samples.

Orofacial Gesture Classification and Validation. The input to train the HMMs varied in each stage. In the first stage to classify between face gestures of smiling and mouth opening (S+O) and miscellaneous gestures (M+N), the input was a structure of 2 elements, consisting of the training samples and a class label (i.e., S+O or M+N). In the second stage of the hierarchical configuration to classify between smiling (S) and mouth opening (O) samples, the input of the HMM included a structure of 2 elements representing training samples and a class label (i.e., S or O). In both structures, the training sample field included N cells of M×33 doubles, where N is the number of samples in the class and M is the number of frames in each video. The disparity in size of the dataset when one class was more heavily represented than the others could potentially skew the HMM and increase the chances of false positives occurring for the other 2 classes.

Each HMM was initialized with 4 states, taken as the first 4 frames of each video. Additionally, a GMM with 3 parameters was incorporated into the models. The models were generated were then tested through a leave-one-subject-out cross validation. In this method, each validation run splits the dataset into a training set which comprises of samples of 65 participants. The resulting model was validated on the samples belonging the participant that was left out to generate the confusion matrix. This process was repeated 65 times, leaving out and validating on the samples of each participant individually. The confusion matrices in each run were added to get an aggregate confusion matrix. The classification accuracy, sensitivity, specificity, precision, recall, and F1-score were then calculated to evaluate the performance of the classifiers.

The classification accuracy is calculated for a binary classification by a dividing the sum of true positive (TP) and true negative (TN) classifications from the confusion matrix by the number of total classifications as follows.

$$Accuracy = \frac{True\ Positive(TP)}{True\ Positive + True\ Negative(TN) + False\ Positive(FP) + False\ Negative(FN)}$$

The overall accuracy for the hierarchical classifiers was determined by weighting the accuracy of each stage by the true positive rate of the previous stage ($TP_1$), as follows:

$$Accuracy_{overall} = \frac{TP_1 \times \frac{TP_2 + TN_2}{TP_2 + TN_2 + FP_2 + FN_2} + TN_1}{TP_1 + TN_1 + FP_1 + FN_1}$$

Sensitivity and specificity for a binary classification were defined as follows:

$$Sensitivity = \frac{TP}{TP + FN}$$

$$Specificity = \frac{TN}{TN + FP}$$

The performance of the classifiers with respect to each individual class was examined in terms of the precision, recall, and F1-score. These metrics offer more insight that is valuable for the goal of this study, which was to evaluate the feasibility of using HMM classifiers to recognize facial gestures for the purposes of AT. The ability of such a system to both classify a gesture when it is present and to not classify false positives for a certain gesture are thus important to minimize false activations.

The precision of a class is the rate at which a predicted gesture from the classifier is actually that gesture, and is defined as follows:

$$Precision = \frac{TP}{TP + FP}$$

The recall of a class is the rate at which an actual gesture is predicted as that gesture by the classifier, and is defined as follows:

$$Recall = \frac{TP}{TP + FN}$$

The F1-score is the harmonic mean of the precision and recall, which are measures of the true positive predictive ability of a binary classification against false positives and against false negatives, respectively. With small classes of data, the F1-score is a metric which allows the performance of the classifier for each individual class to be assessed in an unbiased way, and it was calculated as follows:

$$F1\ score = 2 \times \frac{Precision \times Recall}{Precision + Recall}$$

$$F1\ score = 2 \times \frac{\left(\frac{TP}{TP + FP}\right) \times \left(\frac{TP}{TP + FN}\right)}{\left(\frac{TP}{TP + FP}\right) + \left(\frac{TP}{TP + FN}\right)}$$

Results. The classification performance of the 2-stage hierarchical classifiers achieved 83.2% overall accuracy rate. The classification accuracy of the second stage (S vs. O) was up to 99.23% (98.48% sensitivity rate and 100% specificity rate). Table III reports precision, recall, and F1-scores for each class at each stage of the hierarchical classifier configuration.

TABLE III

PRECISION (PREC), RECALL (REC), AND F1-SCORE (F1) OF EACH CLASS.

|  | Prec (%) | Rec (%) | F1 (%) |
| --- | --- | --- | --- |
| S + O | 81.05 | 87.54 | 84.17 |
| M + N | 86.45 | 79.54 | 82.85 |
| S | 100.00 | 98.46 | 99.22 |
| O | 98.48 | 100.00 | 99.24 |

In stage 1 of the hierarchical classification, precision is highest for the M+N class (86.45%) and recall was highest in the S+O class (87.54%). As the harmonious mean of the two metrics, the F1-score was higher in the S+O class (84.17%). In stage 2 of the configuration, the performance was very high for each metric in each class. The F1-score for the 2 classes were nearly identical.

The orofacial recognition engine described herein allowed selection of features from a large number of candidate features, and had an HMM-based classifier for face gesture recognition for use in AT. Previously, HMM configurations have been used to classify human features and movements such as for face recognition, head posture estimation, hand gesture recognition, and facial expression recognition. However, it was demonstrated herein that HMM can also be used to reliably distinguish specific facial gestures from miscellaneous gestures and to identify smiling and mouth opening using only the geometric features from facial landmarks as the input. These results indicated that an AT can be developed which uses facial gestures as the input to issue commands to a computer or mobile device, and which allows at least 2 different commands to be programmed to correspond to face gestures. Such a system would only require a built-in or USB, 2D camera to interface with the user. A hierarchical HMM configuration can successfully separate specific face gestures (e.g., smiling and mouth opening) from other movements. The 2-stage binary classifier where stage 1 distinguishes smiling and mouth opening from miscellaneous and neutral classes, and where stage 2 classifies between smiling and mouth opening can distinguish smiling from opening with near 100% accuracy, sensitivity, specificity, and precision, recall, and F1-score of each class. These results are due to the integrated feature selection step.

The feature selection step allowed many features to be initially considered and for the best ones to be selected through F1-score thresholding and eliminating redundant features. With 2 separate classification stages, different sets of features can be selected which were more appropriate for each stage. The system can also be adapted to different people depending on differences in how they perform the facial gestures by selecting the features that best represent their movements. A system that includes a customizable feature selection process is adaptable and allows selecting the best classifier for a particular individual. This becomes particularly important for people with disabilities whose facial muscular control may differ from able-bodied individuals. Current works in the literature which use facial gesture recognition for AT usually only consider one facial feature to classify each facial gesture, for example: using the optical flow of the eye and mouth areas to indicate blinks and opening the mouth; using the distance between the eyes and eyebrows; using lip region features as input to an ANN-based classifier. Comparatively, feature selection for the recognition engines described herein showed that by using non-redundant features to characterize face gestures, the classifier can be optimized to avoid model overfitting without compromising classifier performance.

Although overall performance was high and there was no clear area of weakness, performance of stage 1 was not as high as that of stage 2. In stage 1, the precision of the S+O class (81.05%) and the recall of M+N class (79.54%) were relatively low compared to other measures. This indicates that there was approximately a 20% chance of false classification of a miscellaneous or neutral gesture as smiling or mouth opening. In the context of AT, this would lead to false activation at a rate which is not ideal. Nevertheless, this fact does not present a major area of weakness and does not compromise the overall performance of the classifier. Overall, the classifier successfully demonstrated the feasibility of using HMM classifiers for the purpose of automated facial gesture recognition. The classifier can distinguish between smiling, mouth opening, miscellaneous, and neutral gestures with high performance in terms of the overall accuracy, the performance in each binary classification, and for each individual class. The lower overall accuracy of the 2-stage HMM configuration (83.20%) can be partially attributed to the difficulty in identifying the miscellaneous class comprising of several different facial gestures.

The introduction of a miscellaneous class in the classifier added additional complexity to the system, as the miscellaneous class contained a mixture of different facial expressions and gestures which made it more difficult to be characterized via the HMM and the input features. To this extent, the 2-stage classifier benefits from the additional stage of feature selection, where the extra set of features can be more specifically selected to represent a more specific, binary classification as opposed to a multiclass classification in which the features must characterize differences in all 4 classes.

The performance of the proposed hierarchical HMM classification was difficult to compare since no previous work in the literature uses a similar approach. Moreover, no previous research in facial gestures for AT reports sensitivity, specificity, or F1-score as performance indicators. The most direct comparison can be made to the system developed by Oliver, Pentland, and Bérard (LAFTER: a real-time face and lips tracker with facial expression recognition. *Pattern Recognition,* 33(8), 1369-1382, 2000), which classified 5 distinct facial gestures with 95.95% accuracy using a HMM. In terms of accuracy, works in the literature range from 89% for the Eyebrow Clicker, which classified eyebrow raises, to 100% for the Camera Mouse, which used dwelling time to indicate clicks. Cohen, Garg, and Huang (Emotion recognition from facial expressions using multi-level HMM. In *Neural Information Processing Systems* (Vol. 2) 2000) used HMMs to recognize emotions from facial expressions has an accuracy of 78.49% for single HMMs and 82.46% for a multilevel HMM. These results were similar to the overall accuracy of the present recognition engine. Terven et al., (Robust head gestures recognition for assistive technology. In *Mexican Conference on Pattern Recognition* (pp. 152-161). Springer, Cham., 2014) used HMMs to recognize head gestures for AT through the yaw, pitch, and roll of the head. They reported an accuracy of 98.15% for a 6-class problem and 97.65% for a binary classification between head nodding and shaking. These values were consistent with the present recognition engine for the binary classification between smiling and mouth opening. These comparisons support that HMMs can viably be used to classify facial gestures. The cascade of HMM classifiers produced promising results in all performance indicators considered with no clear weaknesses, as the lowest measure is 79.54% sensitivity in the first stage. Therefore, it was concluded that AT using HMM-based classifiers to recognize facial gestures was feasible.

Considering the high performance achieved by the classification algorithm, the pipeline presented in this engine can easily implemented in an AT software tool, because it can effectively separate gestures which should activate the system from those that should not, and classifiers between smiling and opening mouth nearly perfectly. The 2-stage structure is intuitive for use in AT, as stage 1 would correspond to activation and inactivation of the system, and stage 1 would correspond to the particular command that should be issued. Having a miscellaneous class also allows the system to be better trained using the user's own miscellaneous gestures, further improving personalization of the AT.

Other Recognition Engines

In some embodiments, the recognition platform provided herein includes an eye movement (blinking) recognition engine as an example gesture recognition engine 122. In one embodiment, the eye movement recognition engine recognizes an user looking up.

In some embodiments, the recognition platform provided herein includes a tongue movement engine as an example gesture recognition engine 122.

In some embodiments, the recognition platform provided herein includes an eyebrow movement recognition engine as an example gesture recognition engine 122. In one embodiment, the eyebrow movement recognition engine recognizes an user raising an eyebrow.

In some embodiments, the recognition platform provided herein includes a lip movement recognition engine as an example gesture recognition engine 122. In one embodiment, the lip movement recognition engine recognizes lip puckering.

In some embodiments, a combination of multiple classifiers described above was used. The recognition platform provided herein includes words/sounds (audio inputs) and facial movements (visual inputs). In one embodiment, the audio-visual recognition engine recognizes user's words and movements to control another system (e.g., a laptop).

User Interface Application

Figure 2:
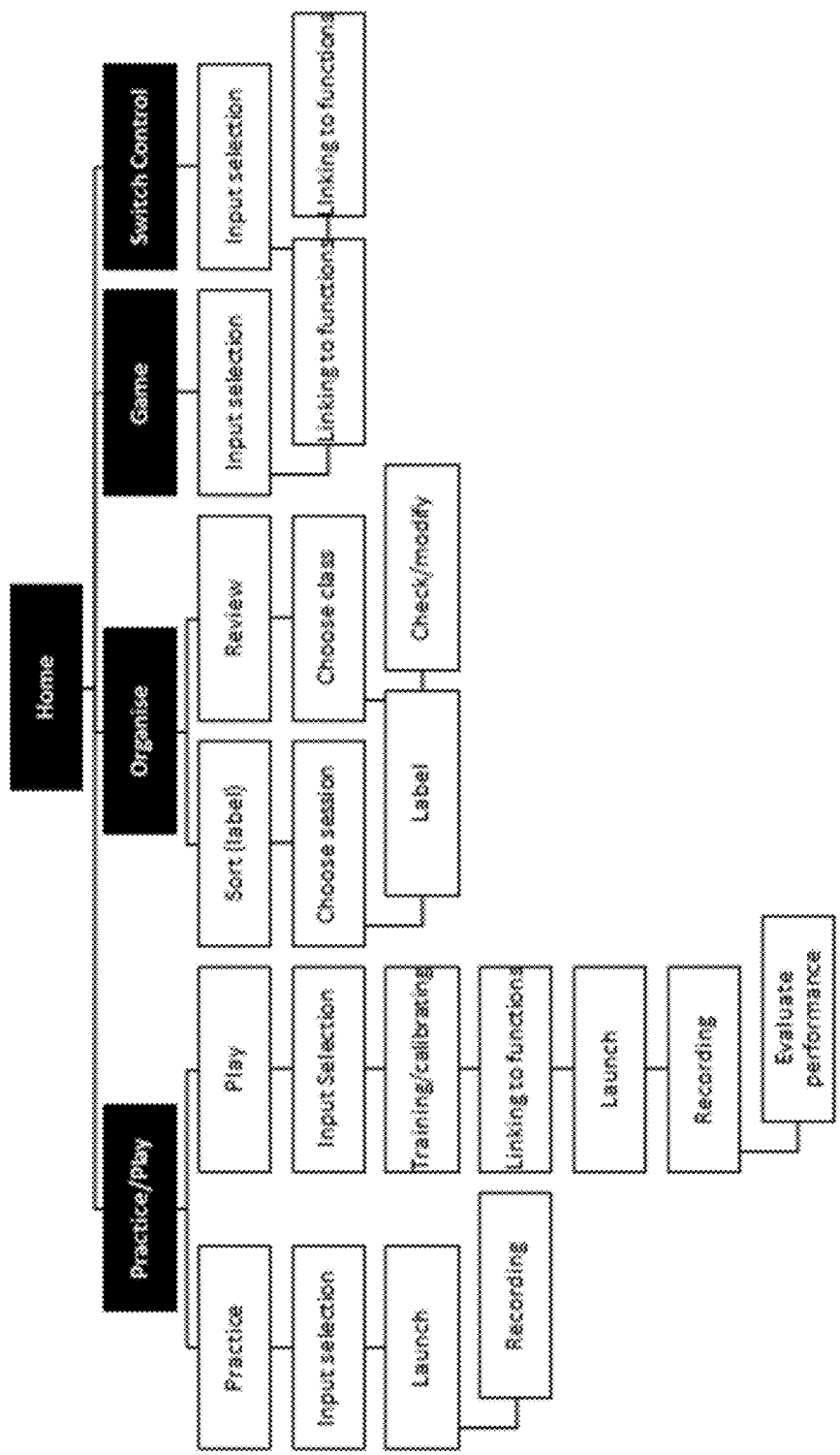
FIG. 2 shows an overview flowchart of the interface application, in accordance with some embodiments.
Figure 3:
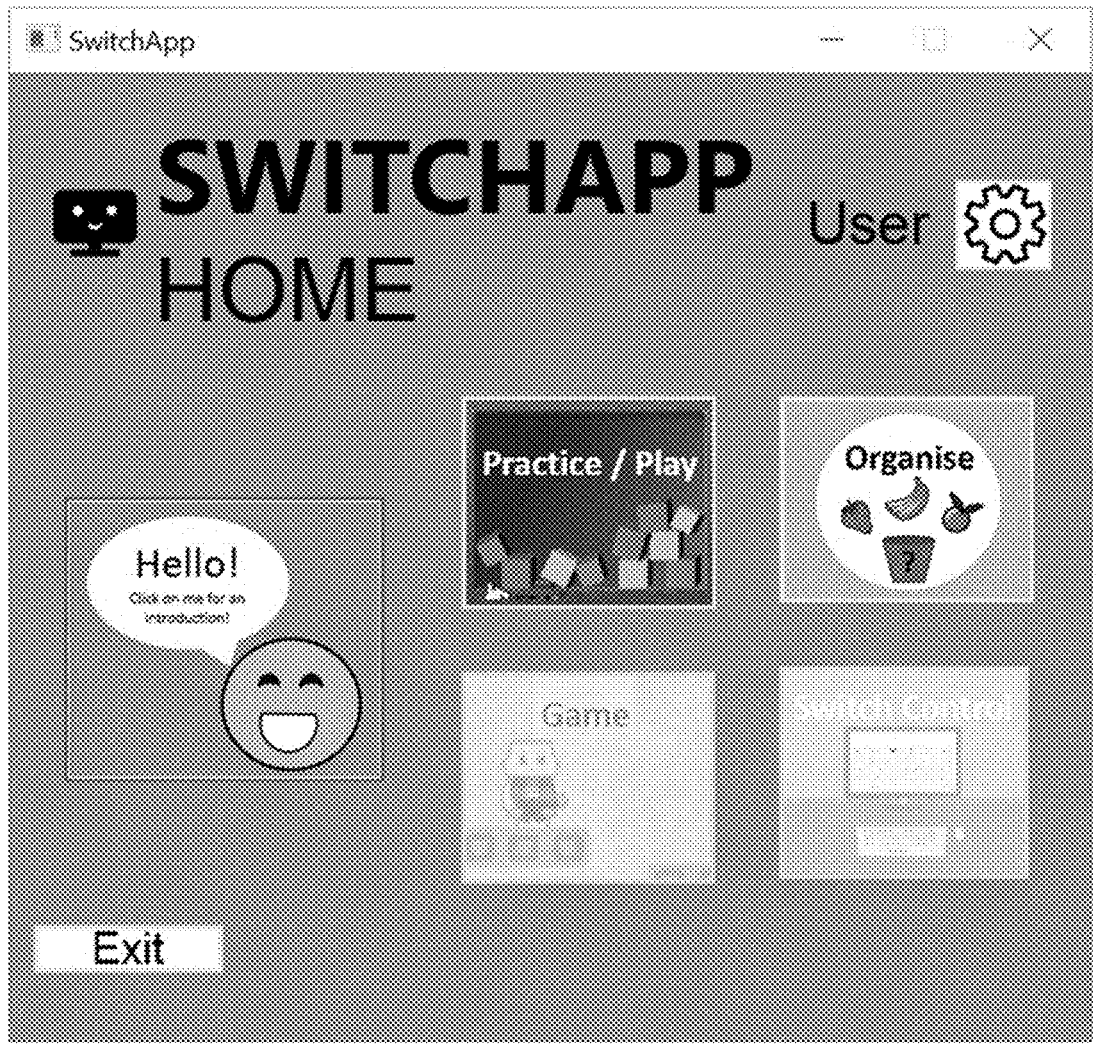
FIG. 3 shows a Home screen of the interface application, in accordance with some embodiments.

FIG. 2 shows an embodiment of an overview of an user interface application 140. User interface application 140 has four example function menus: 1) Practice/Play, 2) Organize, 3) Game, and 4) Switch Control. FIG. 3 shows an example home screen to access the four function menus.

Figure 4A:
FIG. 4A shows a Practice/Play screen of the interface application, in accordance with some embodiments.
Figure 4B:
FIG. 4B shows a Practice screen with options to practice words/sounds or movements, in accordance with some embodiments.
Figure 5A:
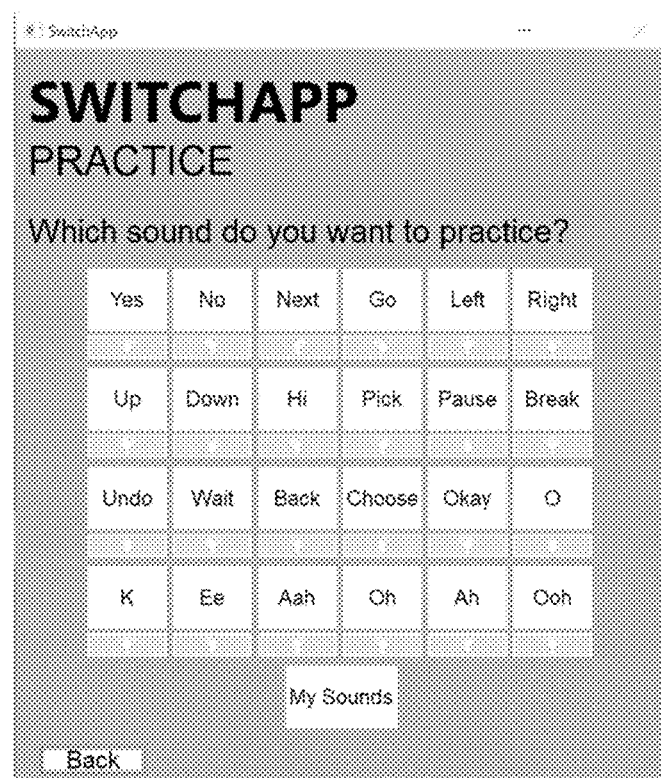

FIG. 4A shows a menu screen for users to enter user input for training a classification model (Practice), or to select trained actions for use in a game interface application 150. An user has the option of entering either sound input or movement input for training a classification model (see FIG. 4B). For sound input, a list of default words (or sounds) are presented (see FIG. 5A). In some embodiments, a list of default word sound audio recordings are presented and selectable for play. In some embodiments, a customized word (or sound) can be saved. By selecting the default or customized words (or sounds), a user can record his or her own vocalization of the default or customized words (or sounds) for training a classification model.

As used herein, a "word" refers to a complete word or a partial word, such as abbreviations. A word also includes dictionary words or non-dictionary words, such as single or multi-syllable sounds.

Figure 5B:
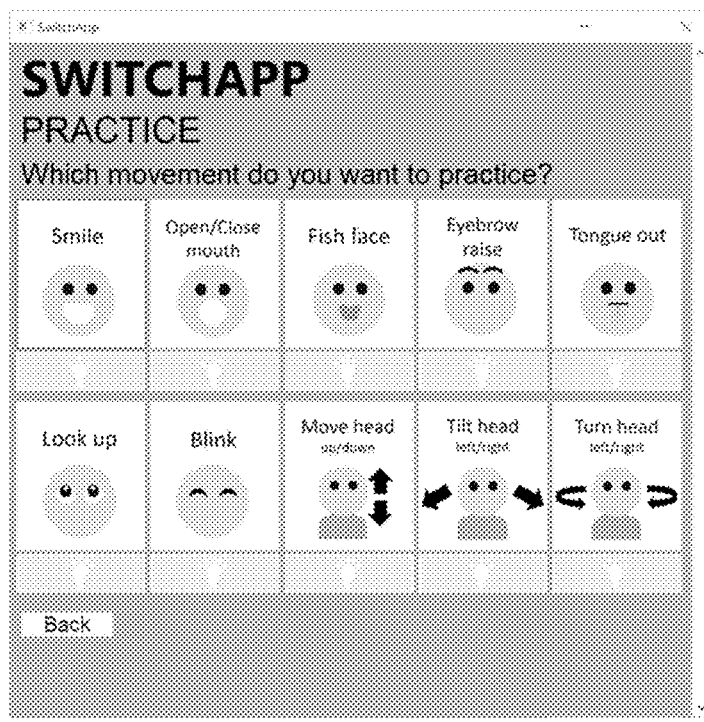
FIG. 5B shows a Practice screen for movements practice, in accordance with some embodiments.

Similarly for movement input, a list of default movements are presented (see FIG. 5B). In some embodiments, a list of default movement video recordings are presented and selectable for play. In some embodiments, a customized movement can be saved. By selecting the default or customized movements, a user can record his or her own performance of the default or customized movements for training a classification model.

Figure 6A:
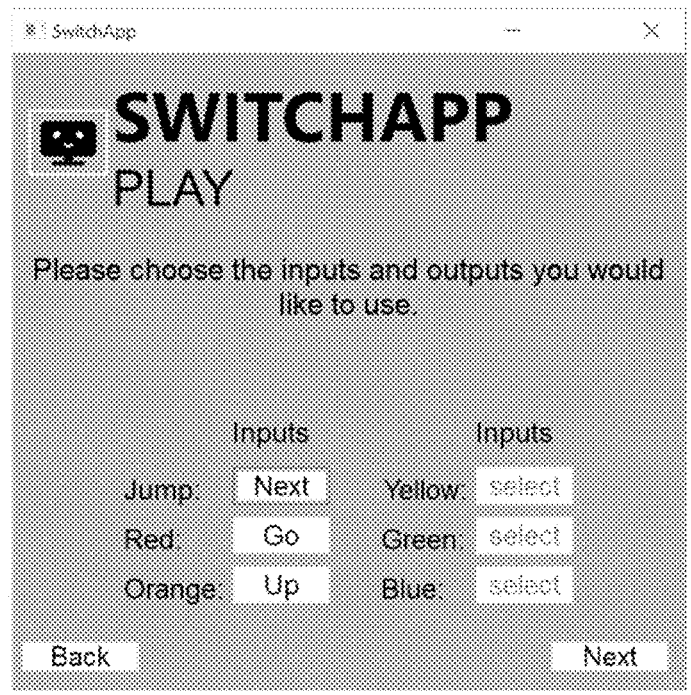
Figure 6B:
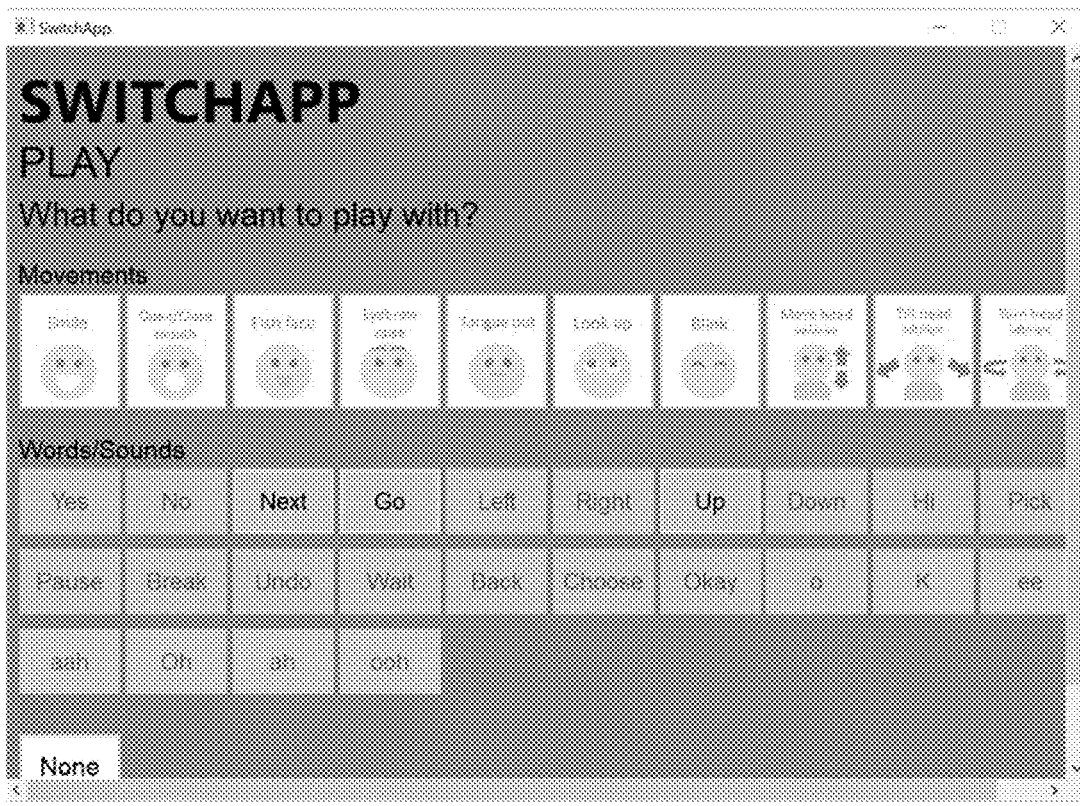
FIG. 6B shows a second embodiment of a Play screen for selecting inputs categorized by words/sounds or movements, for use in playing a game, in accordance with some embodiments.
Figure 6C:
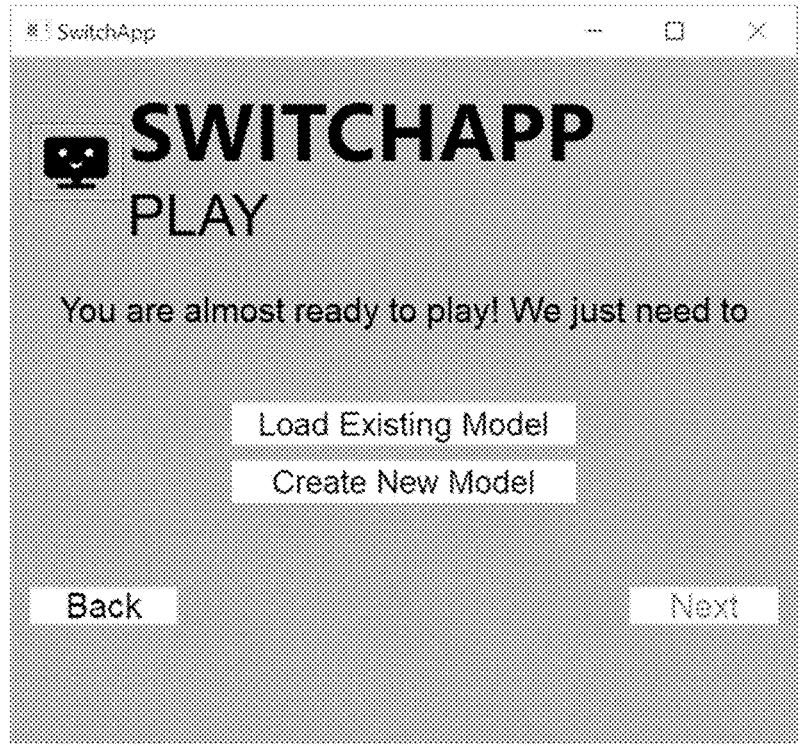
Figure 6D:
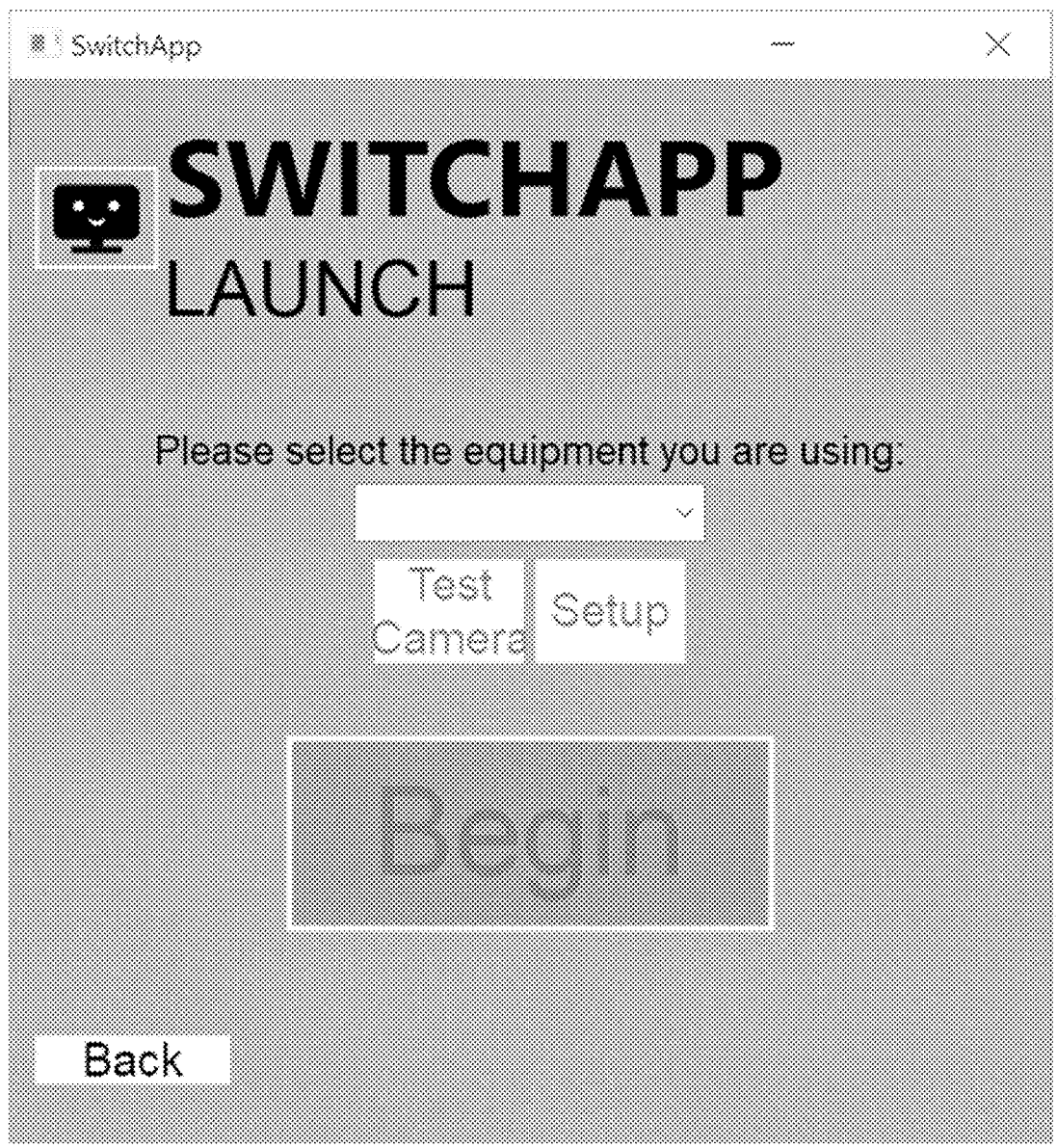
FIG. 6D shows a fourth embodiment of a Play screen for selecting the equipment (webcam/external camera or microphone) and launching the Game application.
Figure 10A:
Figure 10B:
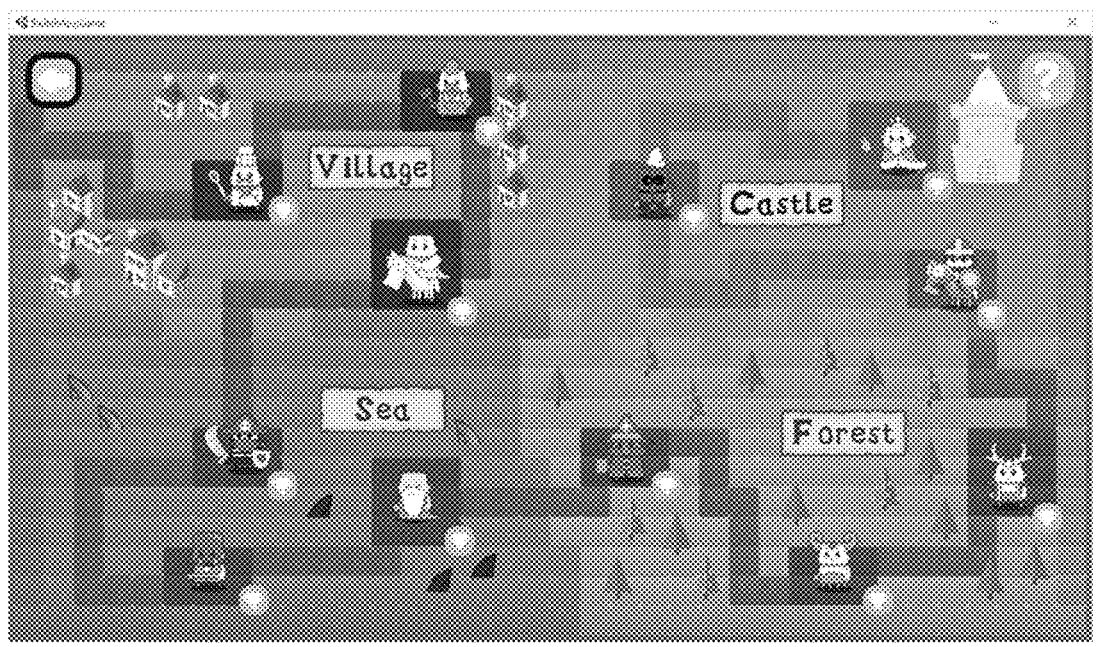
FIG. 10B shows a second Game screen for playing a game using the trained inputs, in accordance with some embodiments.
Figure 10C:
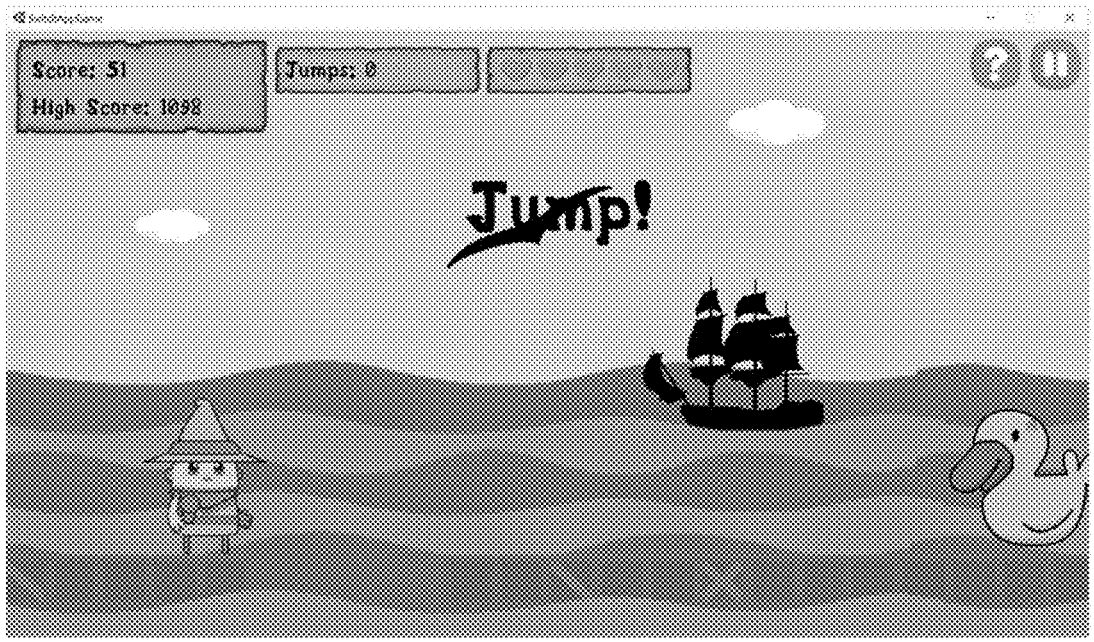
FIG. 10C shows a third Game screen where a system prompt (Jump!) appears on the screen to help users train/play the interface platform.
Figure 10D:
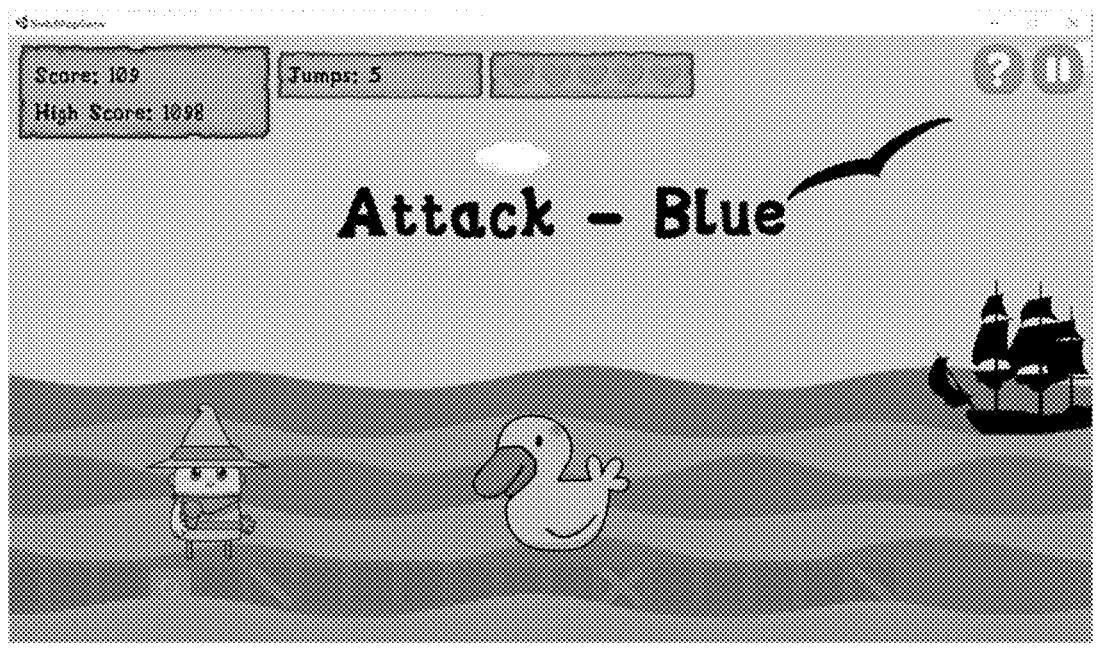
FIG. 10D shows a third Game screen where a system prompt (Attack-Blue) appears on the screen to help users train/play the interface platform.

In some embodiments, recognition platform 110 is trained with user specific word vocalization and/or movement performance, in order to play a game using the words and movement. FIG. 6A shows a menu screen for selecting the words and/or movements to be used in playing a game. FIG. 6B shows another embodiment of a menu screen for selecting the words and/or movements to be used in playing a game. FIG. 6C shows a menu screen for choosing between creating a new model to recognize words/sounds or movements or loading an existing model, already trained. FIG. 6D shows a menu screen where the user can select the recording method (e.g., audio recording or video recording) and the equipment (webcam/external camera or microphone) to train or test the system. At this point, users can execute the game application. In Practice, the system records a user's speech and gestures during the interaction with a game application. In Play, the system evaluates the recognition platform performance (e.g., speaker-dependent recognition engine, head movement recognition engine, orofacial gesture recognition engine) before using the customizable recognition system as switch access (i.e., switch control). FIGS. 10A, 10B, 10C, and 10D show example screens from a game interface application 150 which a user can play using the selected words and/or movements. FIGS. 10C and 10D show how users can play the game using specific prompts (e.g., "Jump!" or "Attack-Blue") for words and gestures. The system waits for audio or visual inputs when a prompt is shown on the screen. In some embodiments, two different inputs (e.g., smiling and opening mouth) can be recorded when two different prompts are shown on the screen (e.g., "Jump!" or "Attack-Blue"). In Play, the performance of the inputs (e.g., smiling and opening mouth) can be automatically evaluated using the system prompts (e.g., "Jump!" or "Attack-Blue"). When the system recognition achieved a certain accuracy rate (i.e., 90%), users can use the platform as switch access to control different technology.

Figure 7A:
FIG. 7A shows an Organise screen of the interface application, in accordance with some embodiments.
Figure 7B:
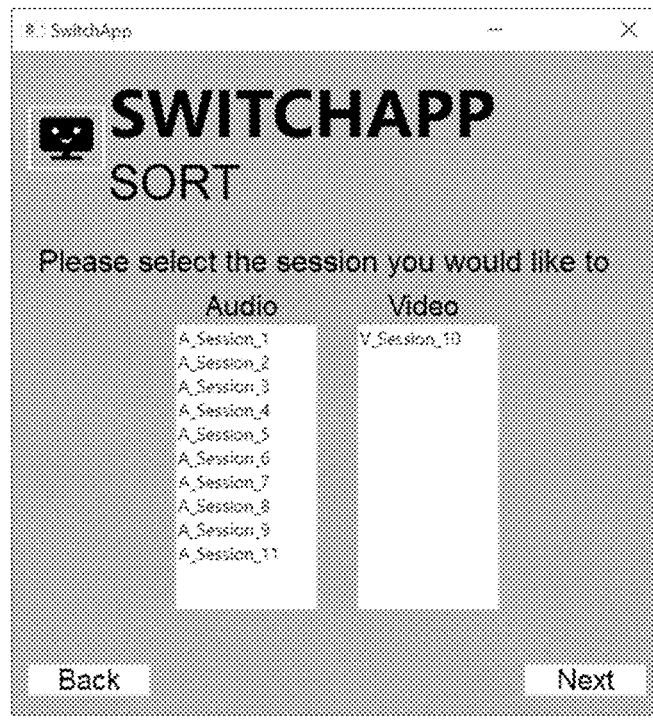
FIG. 7B shows a Sort screen with options to label a previously recorded audio or video file by a user, in accordance with some embodiments.
Figure 8A:
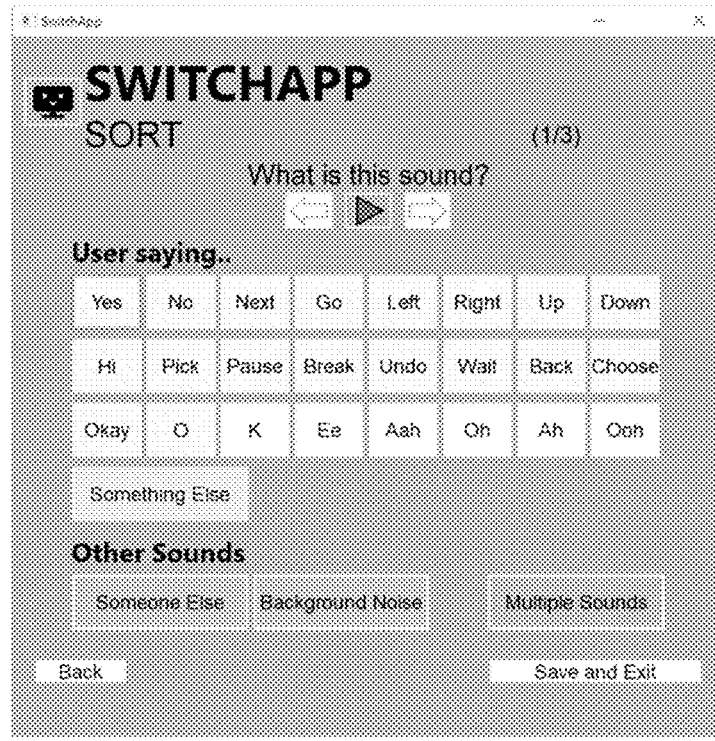
Figure 8B:
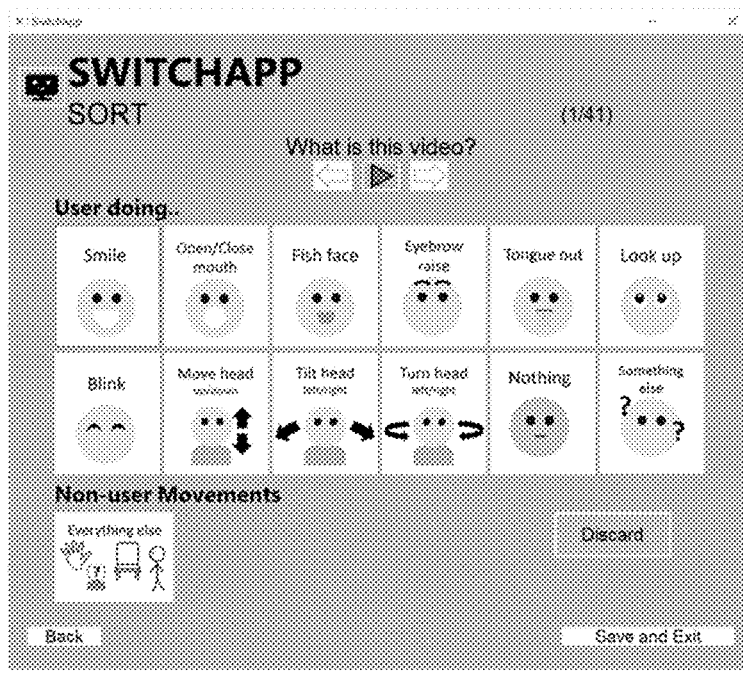
FIG. 8B shows a Sort screen for user-labeling video files, in accordance with some embodiments.

In some embodiments, after Practice, users can classify user input data (Sort) or review the trained inputs (Review). FIG. 7A shows a menu screen for choosing between manually classifying user input data or reviewing trained inputs. In some embodiments, a user can choose to manually classify one or more user input recording sessions (see FIG. 7B). FIG. 8A shows an example user interface application screen for manually classifying recorded user vocalizations of words. FIG. 8B shows an example user interface application screen for manually classifying recorded user performance of movements. A recorded user audio or video file is played, and labeled by selecting the corresponding word or movement from a default list or entering in a new word or movement. In some embodiments, the recorder user audio or video file can be labeled as background noise or non-user movements. In some embodiments, the recorded user audio or video file can be labeled based on different users.

Figure 9A:
FIG. 9A shows a Review screen with options for reviewing a trained words/sounds input or a trained movements input, in accordance with some embodiments.
Figure 9B:
Figure 9C:
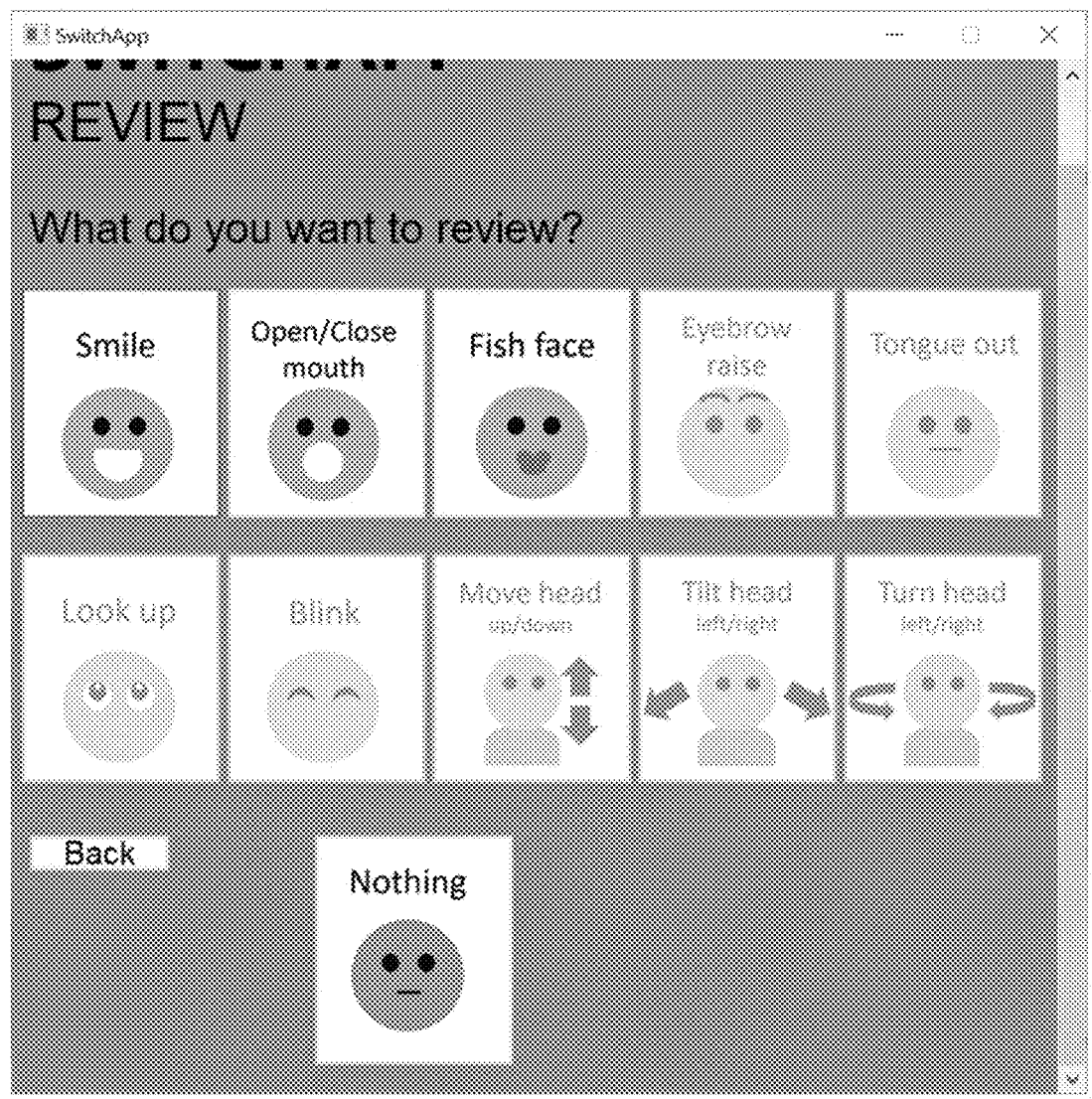
FIG. 9C shows an example review screen for reviewing trained movements, in accordance with some embodiments.

FIG. 9A shows a menu screen for reviewing trained words (or sounds) and movements. For example, a list of trained words (see FIG. 9B) or a list of trained movements (see FIG. 9C) are presented, which users can select to review. At this point, users can train the classification model by providing user input corresponding to the default or customized words and/or movements. When the system is trained, users can test the performance playing the game application (i.e., Play, FIG. 3). After performance evaluation, if the system achieved a high level of accuracy, users can play the game application (i.e., Game, FIG. 3) without video prompts (e.g., "Jump!" or "Attack-Blue" showed in FIGS. 10C and 10D) or select Switch Control (FIG. 3).

In some embodiments, the Switch Control menu provides function interfaces for controlling an access technology device or control a laptop 180.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only. The scope is indicated by the appended claims.

REFERENCES

Ellis, D., 2005. Reproducing the feature outputs of common programs using Matlab and melfcc.m. url: http://labrosa.ee.columbia.edu/matlab/rastamat/mfccs.html Murphy-Chutorian, E., & Trivedi, M. M. (2008). Head pose estimation in computer vision: A survey. IEEE transactions on pattern analysis and machine intelligence, 31(4), 607-626.

Ariz, M., Bengoechea, J. J., Villanueva, A., & Cabeza, R. (2016). A novel 2D/3D database with automatic face annotation for head tracking and pose estimation. Computer Vision and Image Understanding, 148, 201-210

La Cascia, M., Sclaroff, S., & Athitsos, V. (2000). Fast, reliable head tracking under varying illumination: An approach based on registration of texture-mapped 3D models. *IEEE Transactions on pattern analysis and machine intelligence,* 22(4), 322-336.

What is claimed is:

1. A customizable recognition system for differentiating speech or movement of an individual with impairment to interact with accessibility functions of a computer device, the system comprising:
a memory;
a display;
an input unit for capturing audio/video input for different types of speech or gestures of the individual; and
a processor coupled to the memory programmed with executable instructions, the instructions for an interface in communication with the input unit and a computer application with a plurality of accessibility functions to control operation of the computer device, the interface configured to:
receive a user identifier and the audio/video input in response to prompts from the computer application; and
process the audio/video input to determine a control command for the computer application using a customized recognition engine, the customized recognition engine having a classifier for each different input type for the different types of speech or gestures, the classifier linked to the user identifier, the interface configured to provide the control command to the computer application to actuate an accessibility function of the plurality of accessibility functions to control operation of the computer device.

2. The system of claim 1 wherein the interface provides a selectable play mode for the computer application, a selectable train mode to provide training data samples for training the classifiers, and a selectable organize mode for review or labelling of captured audio/video input and the training data samples.

3. The system of claim 1 wherein the interface provides a selectable word indicia for the different types of speech and selectable movement indicia for the different types of gestures.

4. The system of claim 1 wherein the interface provides selectable indicia for different words for the different types of speech.

5. The system of claim 1 wherein the interface receives a sound label for a type of speech input.

6. The system of claim 1 wherein the interface provides selectable indicia for different movements for the different types of gestures.

7. The system of claim 1 wherein the interface receives a movement label for a type of gesture input.

8. The system of claim 1 wherein the interface prompts to request a type of speech input or gesture input.

9. The system of claim 1 wherein the interface provides a selectable setting mode to map the command to the input type.

10. The system of claim 1 wherein the interface trains the classifier for each different input type for the different types of speech or gestures, interface training the classifier using samples of the input type.

11. The system of claim 1 wherein the interface indicates available input types.

12. The system of claim 1 wherein a type of gesture is a tongue gesture, and wherein the customized recognition engine has a classifier for the tongue gesture.

13. The system of claim 1 wherein a type of gesture is a look-up gesture, and wherein the customized recognition engine has a classifier for the look-up gesture.

14. The system of claim 1 wherein a type of gesture is a head movement defined by pitch, roll, and yaw, and wherein the customized recognition engine has a classifier for the head movement.

15. The system of claim 1 wherein a type of gesture is a mouth gesture, and wherein the customized recognition engine has a classifier for the mouth gesture.

16. The system of claim 1 wherein a type of gesture is a blink gesture, and wherein the customized recognition engine has a classifier for the blink gesture.

17. The system of claim 1 wherein the interface, for the different types of speech, prompts for words with a performance score for the prompts from the gaming application.

18. The system of claim 1 wherein the interface provides a selectable set of words for the different types of speech, the selectable set of words based on the user identifier.

19. The system of claim 1 wherein the interface can compute an accuracy of the classifier and display the computed accuracy.

20. The system of claim 1 wherein the interface updated the classifier using a feedback loop.

21. The system of claim 1 wherein the computer application is a gaming application.

22. A method for training a customizable recognition system for differentiating input of speech or gesture from an individual with impairment, the method comprising:
- selecting an input type from a plurality of different input types for a computer application with a plurality of accessibility functions to control operation of a computer device, the input type corresponding to speech, movement or gesture;
- prompting for the input type as part of a training session of the computer application;
- collecting training data samples for the input type in response to the prompt, the samples linked to a user identifier;
- training a classifier for the input type using the training data samples, the classifier linked to the user identifier;
- mapping the input type to a control command of the computer application; and
- configuring an interface with the trained classifier, the interface for communication with an input unit and the computer application, the interface customized for the user identifier, the interface for recognizing input as the input type to trigger the control command within the computer application.

23. The method of claim 22 comprising, testing an accuracy of the trained classifier and displaying the accuracy on the interface.

24. The method of claim 22 comprising, collecting samples during play of the computer application; updating the trained classifier using the collected samples.

25. A customizable recognition system for differentiating speech or movement of an individual with impairment, the system comprising:
- a memory;
- a display;
- an input unit for capturing audio/video input for a tongue gesture or a look-up gesture; and
- a processor coupled to the memory programmed with executable instructions, the instructions for an interface in communication with the input unit and a computer application, the interface configured to:
- receive a user identifier and the audio/video input in response to prompts from the computer application; and
- process the audio/video input to determine a control command for the computer application using a customized recognition engine linked to the user identifier, the customized recognition engine having a classifier for the tongue gesture or the look-up gesture, the interface configured to provide the control commands to the computer application to actuate one or more accessible functions to control operation of the computer device.

* * * * *